United States Patent [19]
Clare et al.

[11] Patent Number: 6,033,002
[45] Date of Patent: Mar. 7, 2000

[54] COLLAPSIBLE MATERIAL CARRIER AND HIDDEN STORAGE SYSTEM FOR VEHICLE BEDS

[76] Inventors: Scott Clare, 3381 Shawn Ct.; Neil G. Long, 2630 Randall Way, both of Hayward, Calif. 94541

[21] Appl. No.: 09/268,594

[22] Filed: Mar. 15, 1999

Related U.S. Application Data

[63] Continuation-in-part of application No. 08/896,392, Jul. 18, 1997, which is a continuation-in-part of application No. 08/685,678, Jul. 24, 1996, abandoned, which is a continuation-in-part of application No. 08/506,893, Jul. 26, 1995, Pat. No. 5,567,000.

[51] Int. Cl.$^7$ .................................. B60P 3/00; B60R 9/00

[52] U.S. Cl. .............................. 296/3; 296/37.6; 296/183; 224/404; 224/405

[58] Field of Search ..................... 296/3, 7, 24.1, 296/37.1, 37.6, 181, 183; 224/402, 403, 404, 405

[56] References Cited

U.S. PATENT DOCUMENTS

| | | | |
|---|---|---|---|
| 1,990,757 | 2/1935 | Stiles | 296/37.1 X |
| 3,245,713 | 4/1966 | Ogilvie | 296/37.6 X |
| 3,727,971 | 4/1973 | Sisler | 296/37.6 |
| 5,476,301 | 12/1995 | Berkich | 296/3 |

*Primary Examiner*—D. Glenn Dayoan
*Assistant Examiner*—Chad D Wells
*Attorney, Agent, or Firm*—L. E. Carnahan

[57] ABSTRACT

A vehicle bed having at least a floor and side panels, and within which is mounted a collapsible material carrier and a hidden storage system. The material carrier may be constructed to rest upon the storage system when in its collapsed position without removal. The vehicle bed may include a collapsible support structure located beneath the floor, and hinged sections of the side panels forming access to the bed or to the hidden storage system. The storage system includes various shelving and compartment arrangements, and may include a drain/air relief valve. The hinged sections of the side panels may be provided with a strut assembly or spring-loaded hinges for maintaining same in an open position.

20 Claims, 15 Drawing Sheets

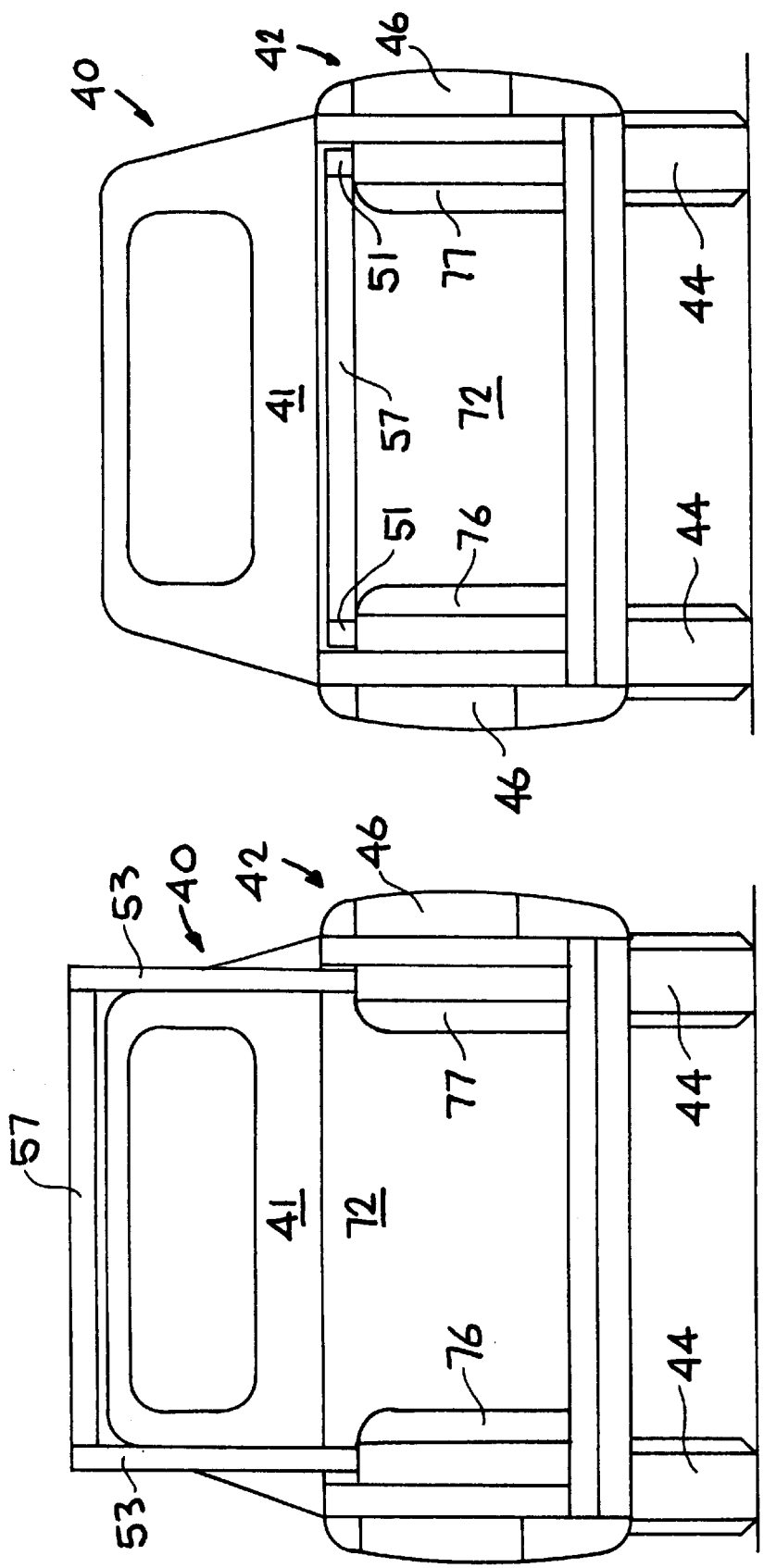

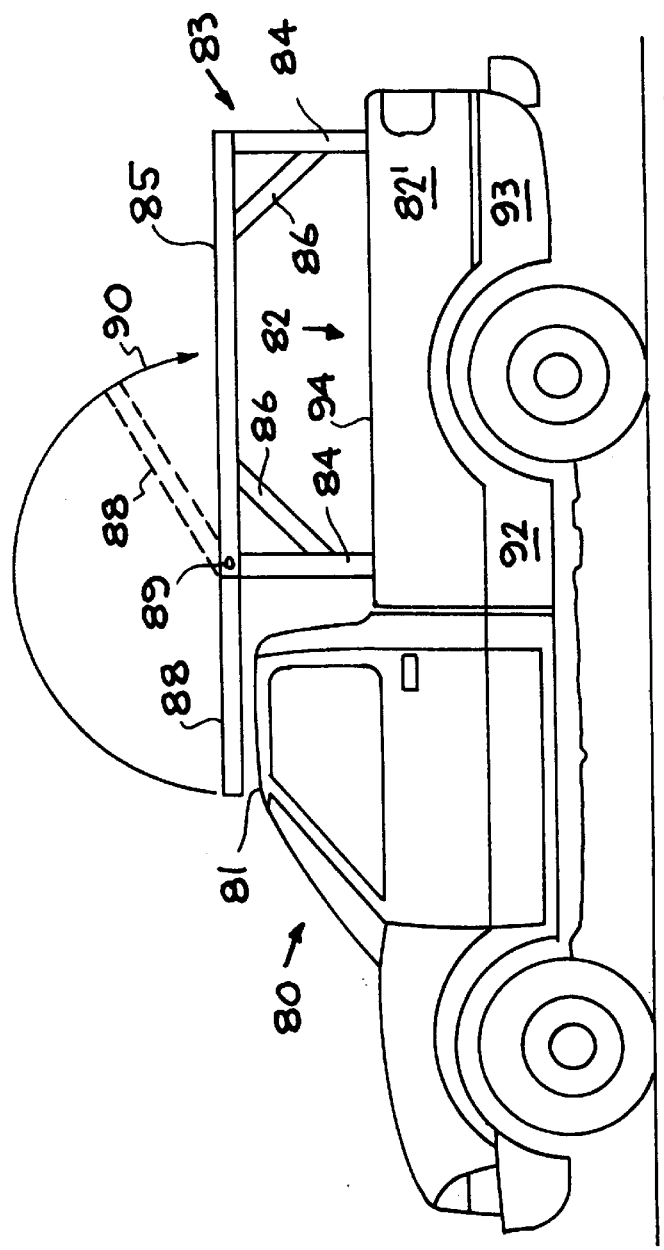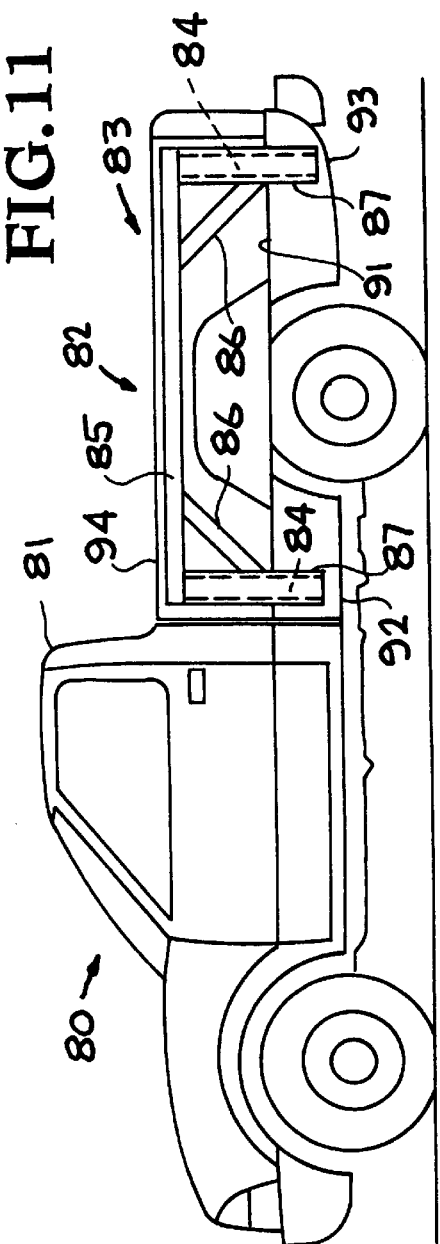

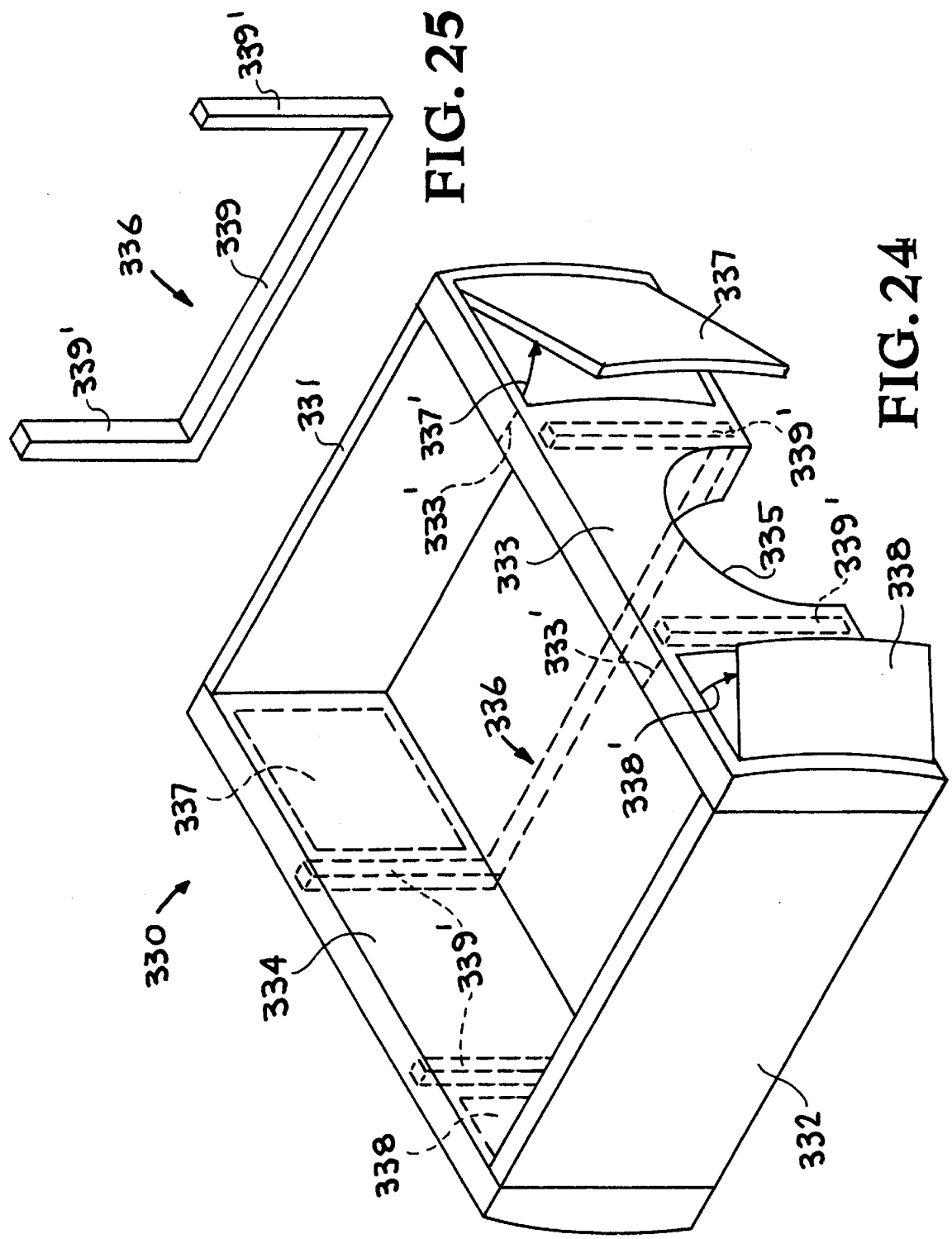

COLLAPSIBLE MATERIAL CARRIER AND HIDDEN STORAGE SYSTEM FOR VEHICLE BEDS

RELATED APPLICATION

This application is a Continuation-In-Part of U.S. application Ser. No. 08/896,392 filed Jul. 18, 1997 still pending, which is a Continuation-In-Part of U.S. application Ser. No. 08/685,678 filed Jul. 24, 1996, now abandoned, which is a Continuation-In-Part of U.S. application Ser. No. 08/506,893 filed Jul. 26, 1995, now U.S. Pat. No. 5,567,000 issued Oct. 22, 1996.

BACKGROUND OF THE INVENTION

The present invention relates to vehicle beds, particularly to material carriers and storage systems for beds of compact-size, mid-size and full-size pickup trucks, trailers, and full-size trucks having side panels, and more particularly to a collapsible material carrier which can be used alone or with a hidden storage for a vehicle bed on a conventional pickup, for example.

Pickup trucks have long been a means for transporting and/or storing tools, materials, etc. for various trades, such as plumbing, electrical, construction, repair, etc. While conventional tool boxes, which generally extend across the pickup bed, and conventional material carriers, which generally extend over the bed and the cab, provide tool storage and a means for carrying long materials, such tool boxes take up a great deal of space and thus reduce the carrying capacity and the material carriers are fixed to the bed. Also, the conventional pickup beds have been removed and replaced with utility type beds of various types, such as exemplified by U.S. Pat. Nos. 3,245,713, 3,727,971, 4,685,695, 5,615,922 and 5,267,773, and material carriers have been mounted to the utility beds. In addition, the pickup truck body and/or beds have been modified to provide storage space, such as exemplified by U.S. Pat. Nos. 2,978,153, 4,917,430 and 5,615,922.

While these prior storage and material carrier arrangements have been satisfactory for their intended purpose, such are an attraction for theft as well as having an appearance of a utility bed. Thus, there has been a need for a more practical material carrier that can be quickly removed or collapsed to remove the appearance of a construction or repair type vehicle, and for a storage system for pickup truck beds which does not alter the bed's external appearance or significantly reduce the interior size of the bed, thereby reducing the tool theft problem while providing space for hidden storage without significant reduction of the bed's carrying capacity.

The need for a hidden storage system for a vehicle bed has been filled by the invention described and claimed in above-referenced U.S. Pat. No. 5,567,000 and in U.S. Pat. No. 5,823,598, issued Oct. 20, 1998. These hidden storage systems may be fabricated by conversion, see U.S. Pat. No. 5,784,769, or by assembly, see U.S. Pat. No. 5,819,390, of a conventional pickup truck bed into a hidden storage bed without altering the external appearance of the bed and without significant reduction in the carrying capacity thereof—a truck with a trunk. This is accomplished by providing storage adjacent the wheel well area, and along the length of the bed, and providing the side panel or fender/side panel of the bed with one or more hinged sections and latch arrangements whereby the side panel or fender/side panel can be opened to expose the storage area, or closed and latched to conceal the storage area. Thus, the pickup can be used for pleasure or work without the appearance of its storage and material carrier capability, and can be parked in areas where theft would likely occur from conventional tool boxes or utility beds. Improvements have been made to the hidden storage bed of the above-referenced patents which include different side panel or fender/side panel hinging, lock and latch systems, collapsible support beams, struts for the fender/side panels, drain/air relief valves, and shelving arrangements including slideable shelves. The above need for a more practical material carrier is provided by the present invention which involves a collapsible material carrier that can be collapsed into the vehicle bed so as not to be seen from a side view of the bed.

SUMMARY OF THE INVENTION

It is an object of the present invention to provide a collapsible material carrier for a vehicle bed.

A further object of the present invention is to provide a hidden storage system for a vehicle bed, such as a conventional pickup truck bed, without substantially altering the external appearance of the bed, in combination with a collapsible material carrier.

A further object of the invention is to provide a pickup truck bed, for example, with storage and material carrying capability without a significant reduction in the carrying capacity thereof.

Another object of the invention is to provide a vehicle bed with hidden storage capability without significantly altering the external appearance of the bed, wherein sections of or the entire side panels of the bed are hinged to enable the side panel or sections thereof to be opened or closed to expose storage shelves which may be fixed, slideable or adjustable, and to provide a material carrier which can be collapsed into the vehicle bed without significant loss of carrying capacity of the bed.

Another object of the invention is to provide a vehicle bed with a collapsible material carrier and a hidden storage system having sections or the entire side panel or fender/side panel of the bed hinged to allow access to the storage area, and wherein the material carrier is collapsed onto the storage system so as not to be seen from a side view of the bed.

Another object of the invention is to reduce theft potential from a storage bed of pickup trucks, etc., and improve the safety of such vehicles when the bed is impacted from the side by providing collapsible support beams for the bed.

Another object of the invention is to provide a vehicle bed having both a hidden storage system and a collapsible material carrier, where the material carried is collapsed onto storage boxes of the hidden storage system located in the bed, and wherein the storage system includes at least one hinged vehicle bed side panel section with at least one strut assembly for maintaining same in an open position.

Another object of the invention is to provide a standard bed, such as pickup trucks of various sizes, trailers or full-size trucks having side panels or fender/side panels with a combination of a collapsible material carrier, and a hidden storage system.

Other objects and advantages of the invention will become apparent from the following description and accompanying drawings. The invention involves a collapsible material carrier that can be utilized with or without a hidden storage system for vehicle beds, such as pickup truck beds, that can be installed, for example, in any fleetside or stepside bed without altering the bed's appearance. A vehicle having side panels can be fabricated or modified to include the collapsible material carrier and/or the storage system. The storage system is installed in the wheel well area of the bed, and uses hinges to open and close sections or the entire fender/side panel of the bed, either upward, downward or sideways. The hinged fender/side panel or side panel section or sections are provided with a latching and lock mechanism, which may be electrically, hydraulically, pneumatically, or mechanically activated. Since the storage system only involves the area of bed adjacent the wheel wells, and the collapsible carrier is collapsed over the wheel wells, it does not significantly reduce the carrying capacity of the bed. The collapsible carrier also folds out of sight and below the wind stream during vehicle operation, thereby maintaining vehicle fuel efficiency. By providing a collapsible material carrier alone or in combination with a hidden storage system for a pickup truck bed, for example, the potential of theft therefrom is substantially reduced since the unaltered appearance of the bed's external surfaces and the hidden material carrier would not lead one to a realization that it contained tools, materials, etc. The hidden storage system thus provides a truck with a trunk. The hidden storage system includes struts to hold the side panel or side panel sections open and collapsible support beams to improve safety from fuel tank rupture due to a side impact.

BRIEF DESCRIPTION OF THE DRAWINGS

The accompanying drawings, which are incorporated into and form a part of the disclosure, illustrate an embodiment of a collapsible material carrier and embodiments of the hidden storage system and, together with the description, serve to explain the principles of the invention.

FIG. 7 is a rear or end view of the pickup truck of FIG. 5 with the tailgate omitted showing the collapsible material carrier.

FIG. 8 is a rear or end view similar to FIG. 7, but with the material carrier collapsed into the bed.

FIGS. 11–14 schematically illustrate another embodiment of the collapsible material carrier of the invention, which is of a telescoping type support within a vehicle bed.

FIGS. 24 and 25 illustrate a pickup truck bed with hinged doors which allow access to the interior of the bed through the side panels, and structural yokes for strengthening long beds.

DETAILED DESCRIPTION OF THE INVENTION

The present invention involves a collapsible material carrier which can be utilized alone or in combination with a hidden storage system for a pickup truck bed as described, for example, in above-referenced U.S. Pat. No. 5,567,000. The present invention reduces the theft potential from vehicle beds by eliminating the appearance of such beds having storage means and a material carrier therein. The invention utilizes lost space adjacent the wheel wells of the bed while maintaining the space between the wheel wells. As known, the space between the wheel wells of a conventional pickup truck bed, for example, is up to about four (4) feet and the conventional pickup truck beds have a length of up to about eight (8) feet and longer, wherein sheets of 8 ft. by 4 ft. material, such as plywood, etc., can be carried between the wheel wells. However, the space in front and back of the wheel wells is generally considered lost space for large items until material has been stacked above the height of the wheel wells. Thus, by utilizing the area in front, back, and above the wheel wells as hidden storage space, the overall storage/carrying capacity of the bed is increased between the outer fender panels of a stock pickup by removing the inner fender panels thereof. Here, the term storage space is defined as that space in which tools, such as vices, saws, parts, skis, golf clubs, etc. can be stored or mounted for use, and in which shelves can be secured or movably mounted for retaining such tools, parts, skis, etc. While the description is directed to a compact, mid-size or full-size pickup bed, the system of the invention can be incorporated into trailers and full-size trucks which utilize side panels or fender/side panels. The collapsible material carrier collapses into the vehicle bed and rests upon the storage boxes positioned in front of, in rear of and over the wheel wells. Thus, the collapsed material carrier is not viewable from a side view of the bed since it is located below the upper edge of the bed.

By the present invention, a conventional pickup truck bed of the ½ ton to 1 ton size, for example, and of a single or dual rear wheel type, may be initially fabricated or converted to a hidden storage bed with a collapsible material carrier, whereas the conventional installation of storage/utility beds involve the replacement of the conventional bed. The fabrication of the bed with a storage system therein may also be accomplished by a modular assembly method such as described and claimed in U.S. applications Ser. No. 08/896, 388 filed Jul. 18, 1997, entitled "Hidden Storage/Utility System Modular Fabrication Method", and in Ser. No. 09/183,851 filed Oct. 30, 1998, entitled "Modular Fabrication And Assembly Method For Vehicle Hidden Storage System".

Figure 1:
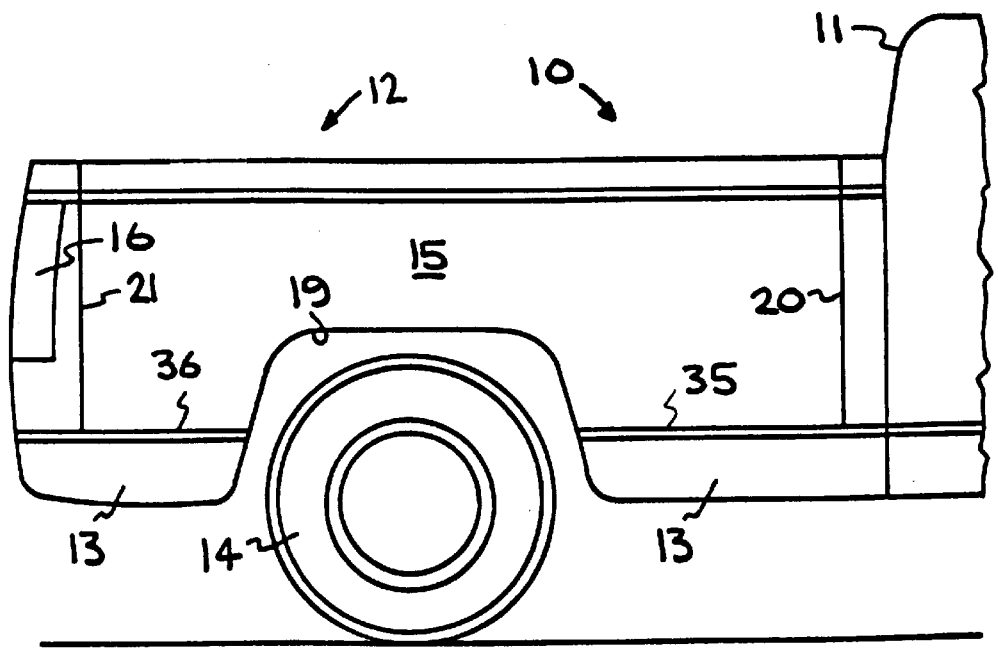
FIG. 1 is a view of a side of a pickup truck bed which has been modified to incorporate a storage system under the closed side panel or fender/side panel of the bed.
Figure 2:
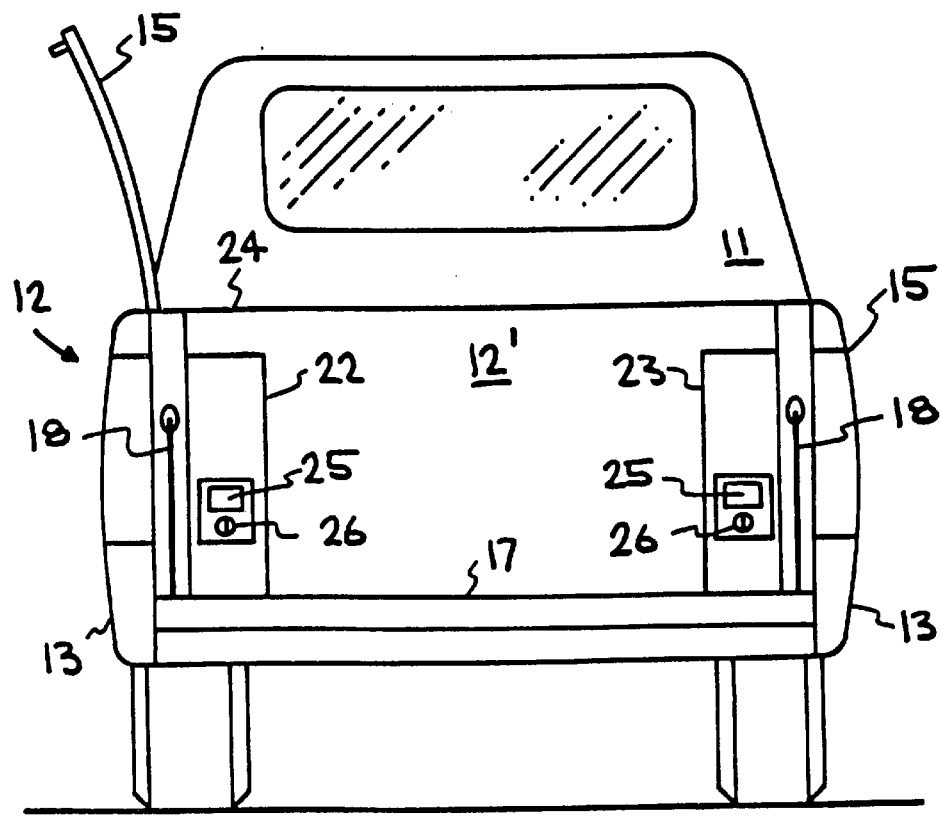
FIG. 2 is an end view of the pickup truck bed of FIG. 1 showing the left fender/side panel open, the right fender/side panel closed, the tail-gate open, and the storage boxes and lock mechanism within the bed.
Figure 3:
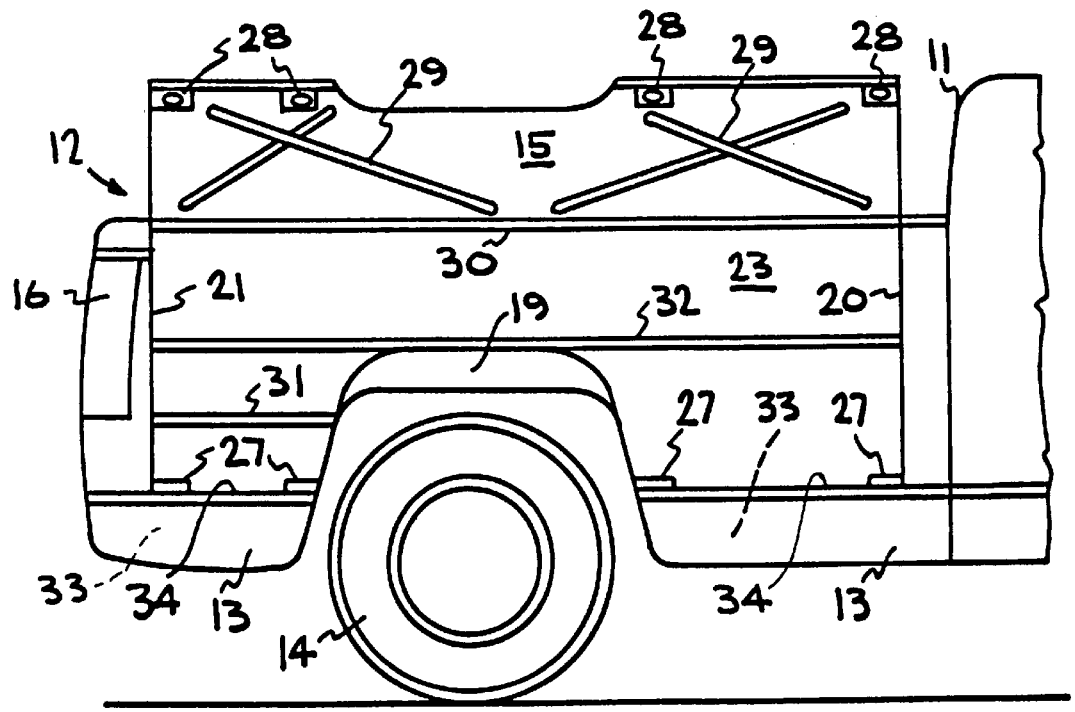
FIG. 3 is a view of an embodiment of the storage system of the FIG. 1 pickup truck bed with the fender/side panel raised to illustrate the storage bin shelves and latch mechanism.
Figure 4:
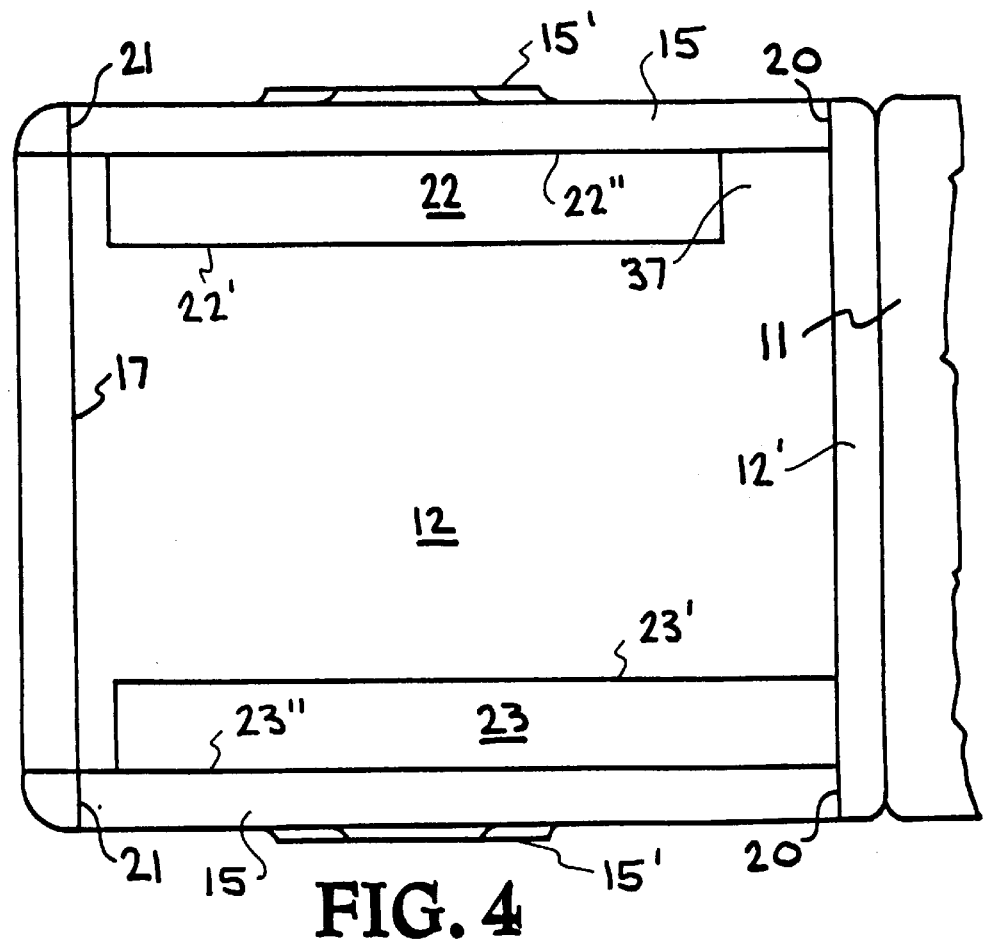
FIG. 4 is a top view of the FIG. 1 pickup truck bed illustrating the storage boxes and fender/side panels, with the tail-gate closed.

Referring now to the drawings, FIGS. 1–4 illustrate a conventionally appearing pickup truck generally indicated at 10 having a cab 11, bed 12, a frame or undercarriage 13 with outer trim sections, and wheels 14. The bed 12 is mounted on frame or undercarriage 13 and includes a bulkhead 12' and side panels 15 having fenders 15', see FIGS. 3 and 4, a tail-light arrangement 16, a hinged tail-gate 17 with stop mechanisms 18, and wheel wells 19. However, the bed 12 of FIGS. 1 and 2 has been modified with the only indication of such modification being the cuts, small spaces, or lines 20 and 21 in the side panels 15, as shown in FIG. 1, with the side panel being closed. Note that in this embodiment the side panels 15 terminate adjacent the frame or undercarriage 13, and bins or pockets may be formed under the outer trim panels or sections of the undercarriage, as described hereinafter. As seen in FIGS. 2, 3 and 4, the hidden storage area is provided by storage or structure boxes 22 and 23 having openings therein mounted within the bed 12 and over the wheel wells 19, the boxes 22 and 23 being constructed to cover the wheel wells 19, but not extend to the top or upper surface 24 of bed 12, and terminate in spaced relation to tail-gate 17. Boxes 22 and 23 are secured to bed 12 along a line 22' and 23' as by welding, bonding, etc., and are secured to side panels 15 along a line 22" and 23", as seen in FIG. 4. A latch mechanism 25 is mounted in the rear of each of boxes 22 and 23, as seen in FIG. 2, and is provided with a key lock 26. The latch mechanism 25 includes latch members 27 located in spaced relation along the bed 12, and which cooperate with corresponding latch members 28 in side panel 15, as shown in FIG. 3. While not shown, the latch members 27 are interconnected by a rod or cable which is connected to mechanism 25 which includes a release for members 27. The boxes 22 and 23 may extend the full length of the bed 12, be shorter than the full length, as shown in FIG. 4, with a space adjacent the tail-gate 17, or with a space adjacent the bulkhead 12' ahead of box 22 as shown at 37 in FIG. 4, which may serve as a rope storage area, for example.

As seen in FIG. 3, the side panels 15 are each provided with braces 29 and a hinge 30 that extends the full length thereof. Hinge 30 may also be composed of sections or replaced by spring-loaded hinges. Shelves 31 and 32 are secured to the interior of storage or structure boxes 22 and 23, and the area forward and rearward of the wheel well 19 forms storage pockets or bins 33 which may have removable covers 34. The bins 33 are located behind the outer trim sections or panels. The hinges 30 are located on the interior of the bed 12 and thus are not visible from the exterior. As shown in FIG. 1, the side panels 15 are separated from outer trim sections 13 by cut lines 35 and 36.

Figure 5:
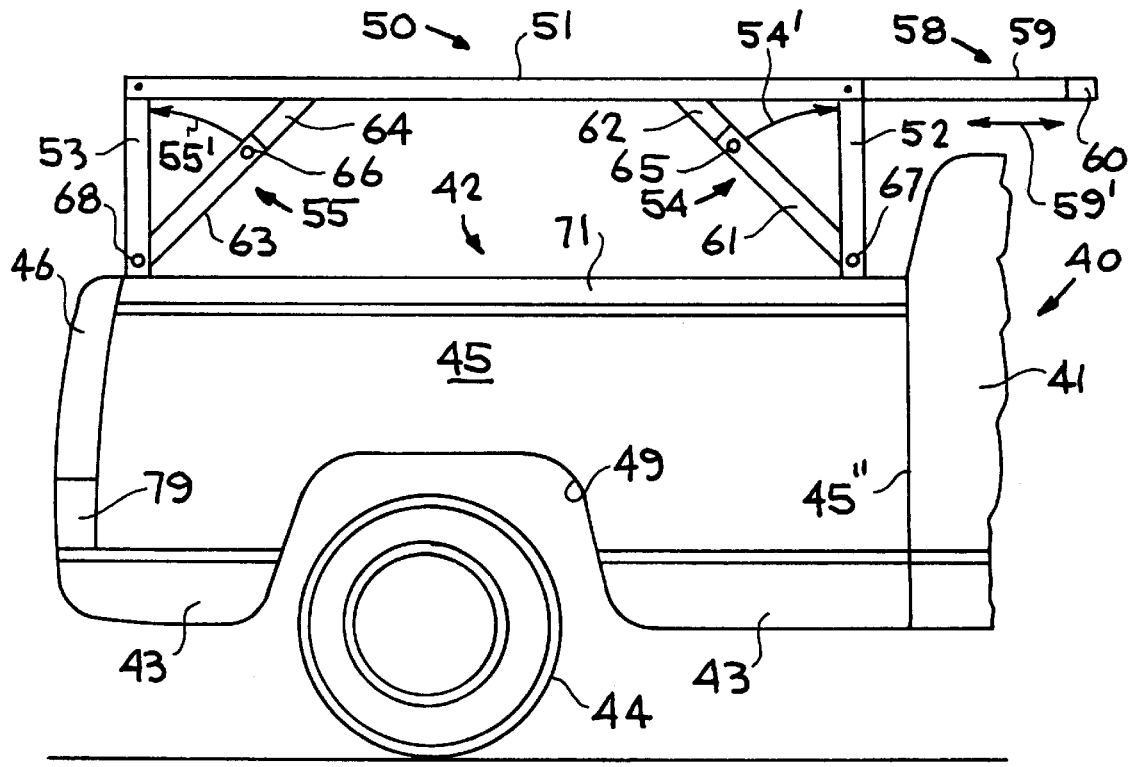
FIG. 5 is a side view of a pickup truck with a collapsible material carrier mounted in the bed.
Figure 23:
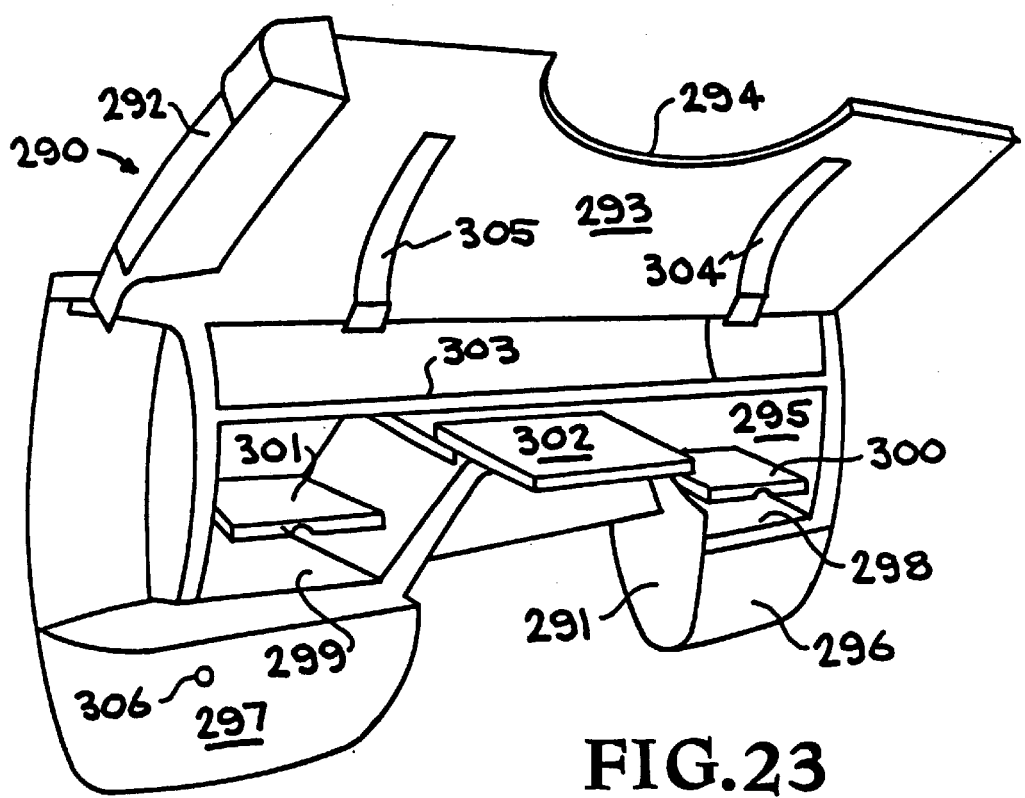
FIG. 23 illustrates a shelving/storage arrangement utilizing adjustable and/or slideable shelving in the storage box of the bed, and storage pockets located in a side panel of the bed.

In another embodiment of the hidden storage system, the cut lines 20 and 21 of FIG. 1 were eliminated, and the hinged side panel 15 extends from the forward end of the bed 10 to the tail-light arrangement 16, as shown in FIG. 5, and the only visible cut or line extends downwardly from the tail-light arrangement to the outer trim panel or section. Also, as shown in FIG. 23, the tail-light arrangement may be included with the hinged side panel.

To illustrate the effectiveness of the hidden storage system, a pickup bed was modified to incorporate the hidden storage on only one side using the above-described modification of FIG. 1 (see FIG. 5) wherein the hinged side panel extended from the front end or edge of the bed to the tail-light assembly, with the only exposed line or cut being the short cut below the tail-light assembly. Thousands of people who viewed the modified pickup from both sides of the bed were unable to determine which side incorporated the hidden storage system. Since the storage box, such as box 22 of FIG. 1, terminated below the upper edge of the pickup side panel, it could not be seen from an external side viewing of the bed. This clearly verified the potential the hidden storage system has to eliminate or substantially reduce loss by theft. Further, the pickup containing the hidden storage system of FIG. 1 was parked in a high crime area (where conventional utility beds such as the above-referenced utility beds were continuously broken into) to determine if theft attempts would be carried out. None were, obviously, because those having the intent of theft were unable to recognize that the pickup contained a storage area.

Figure 9:
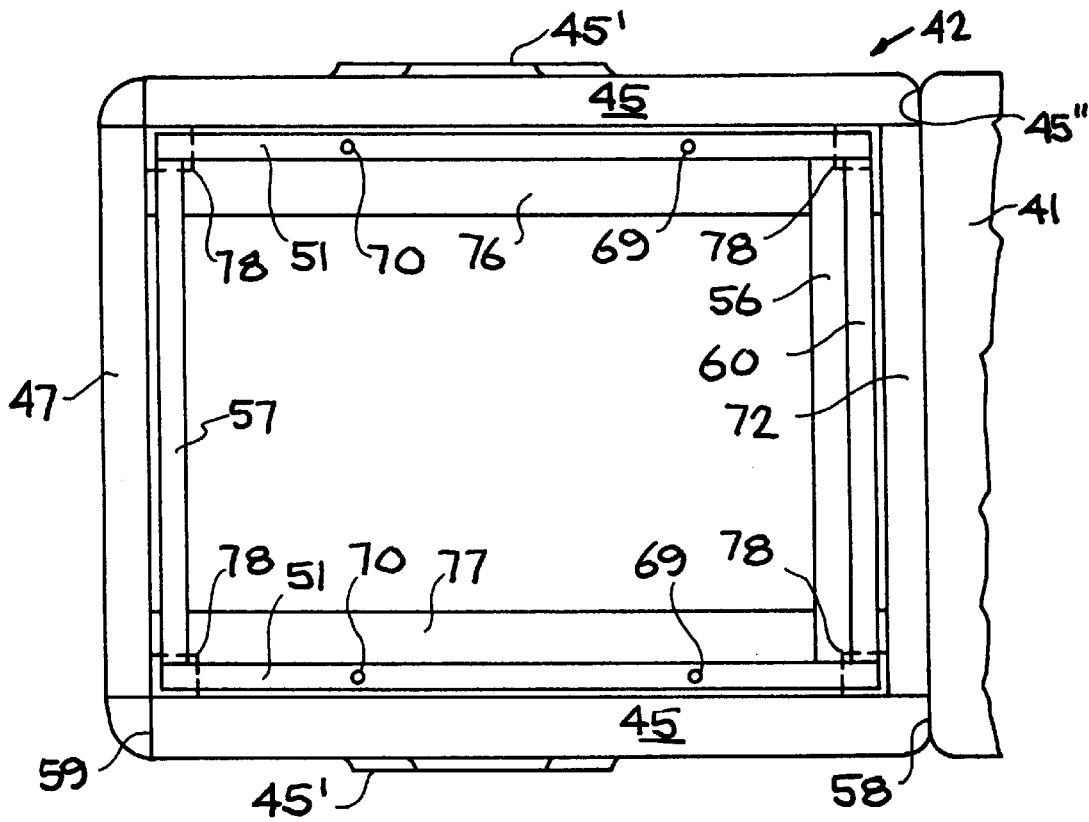
FIG. 9 is a top view of the pickup of FIG. 5, with the material carrier in collapsed position and illustrating collapsible support beams under the bed.

FIGS. 5–9 illustrate a pickup generally indicated at 40 having a cab 41 and a bed 42 mounted on a frame or undercarriage having trim panels 43, wheels 44, with the bed including side panels 45, which may include fenders 45', a tail-light assembly 46, a hinged tail-gate 47, and a wheel wells 49. Mounted in the bed 42 via support members (see FIG. 9) is a collapsible material carrier generally indicated at 50, which includes a pair of horizontal members 51, a front pair of vertical members 52, a rear pair of vertical members 53, a pair of forward collapsible or foldable mechanisms 54, each secured to a front vertical member 52 and a horizontal member 51, two pair of rear collapsible or foldable mechanisms 55 each secured to a rear vertical member 53 and a horizontal member 51, a pair of cross members or stabilizers 56 and 57, with cross member or stabilizer 56 being located intermediate the front vertical members 52 and cross member or stabilizer 57 being located intermediate rear vertical members 53, and a retractable over-cab or overhang generally indicated at 58 having a pair of horizontal members 59 and a cross member or stabilizer 60, horizontal members 51 being constructed to enable horizontal members 59 to retract therein as indicated by arrow 59'. The horizontal members 51 and 59, vertical members 52 and 53, and cross members or stabilizers 56, 57 and 60 may be constructed of a metal or other structural strength material capable of supporting and transporting material secured across the cross members, and these members may be of an angular, square, tubular, etc. cross-section and secured together by bolts or pins, for example. Note that when the retractable overhang 58 is retracted into horizontal members 51, cross member or stabilizer 60 is positioned adjacent cross member or stabilizer 56, as seen in FIG. 9. The collapsible or foldable mechanisms 54 and 55 each include a pair of members 61–62 and 63–64 which pivot on pins 65 and 66 as indicated by arrows 54' and 55', with members 61 and 63 pivotably connected at pins 67 and 68 to vertical members 52 and 53, and members 62 and 64 are pivotably connected to horizontal members 51 by pins 69 and 70, as shown in FIG. 9.

Figure 6:
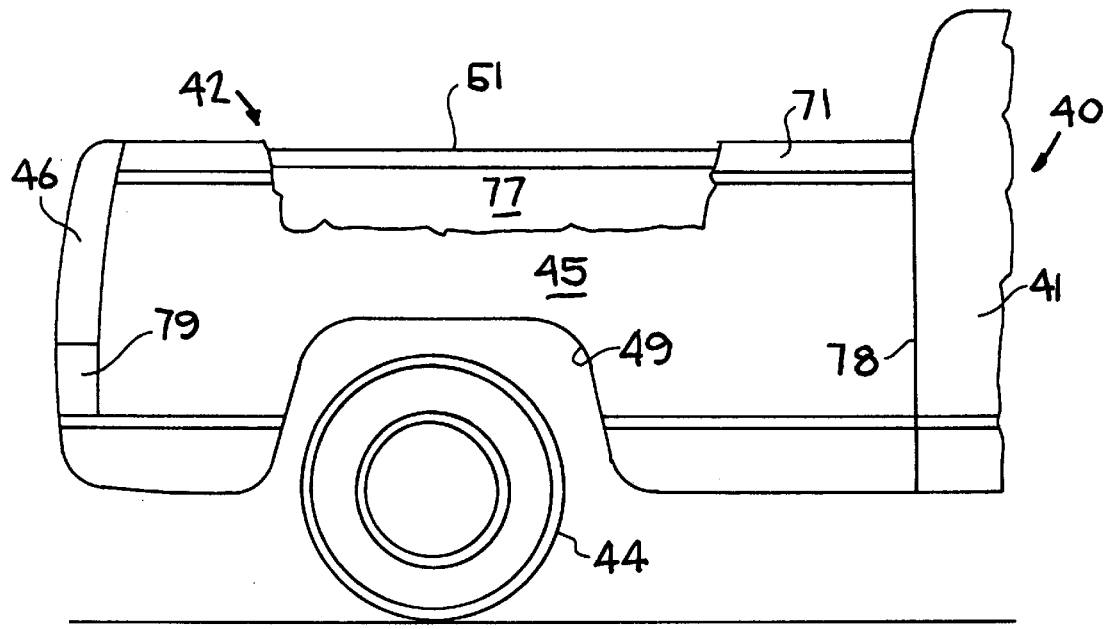
FIG. 6 is a side view of the pickup truck of FIG. 5 with the material carrier collapsed into the bed.

As shown in FIGS. 7, 8 and 9, when the collapsible material carrier 50 is collapsed with the overhand 58 retracted into horizontal members 51, it is located within the bed 42, with horizontal members 51 being located below an upper edge 71 of bed 42, as seen in FIG. 6, and the front and rear cross members 56 and 57 are located below an upper edge of bulkhead or front sections 72 of bed 42 and the tailgate 47, as seen in FIG. 8.

Figure 10:
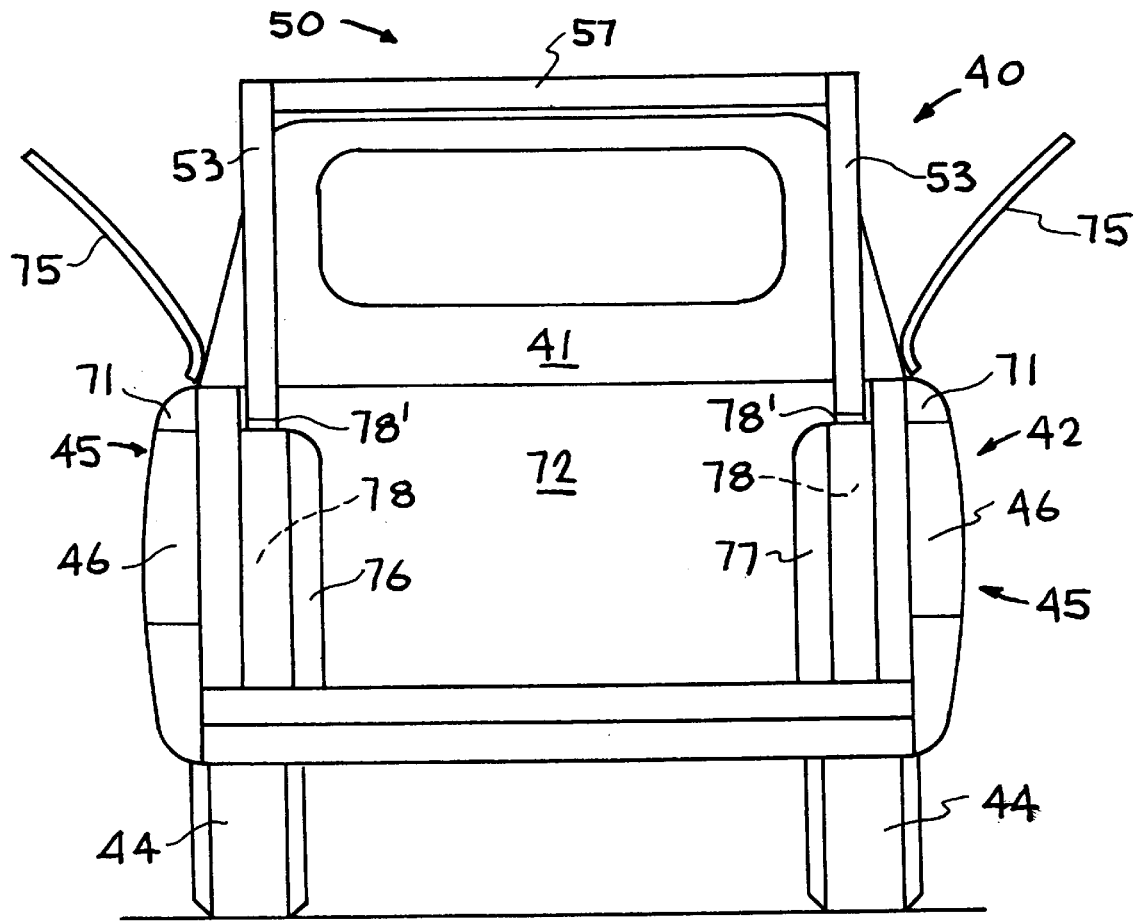
FIG. 10 is a rear view of a pickup truck in which the storage system, such as FIGS. 1–4 and the collapsible material carrier of FIGS. 5–9 are mounted in the bed.

The vertical members 52 and 53 of collapsible material carrier 50 are mounted in bed 42 by hollow support members 78 vertically mounted adjacent each corner of bed 42 and extend through storage boxes 76 and 77, as shown in FIG. 9, and are secured in support members 78 via attachment pins or bolts 78', shown in FIG. 10.

Figure 17:
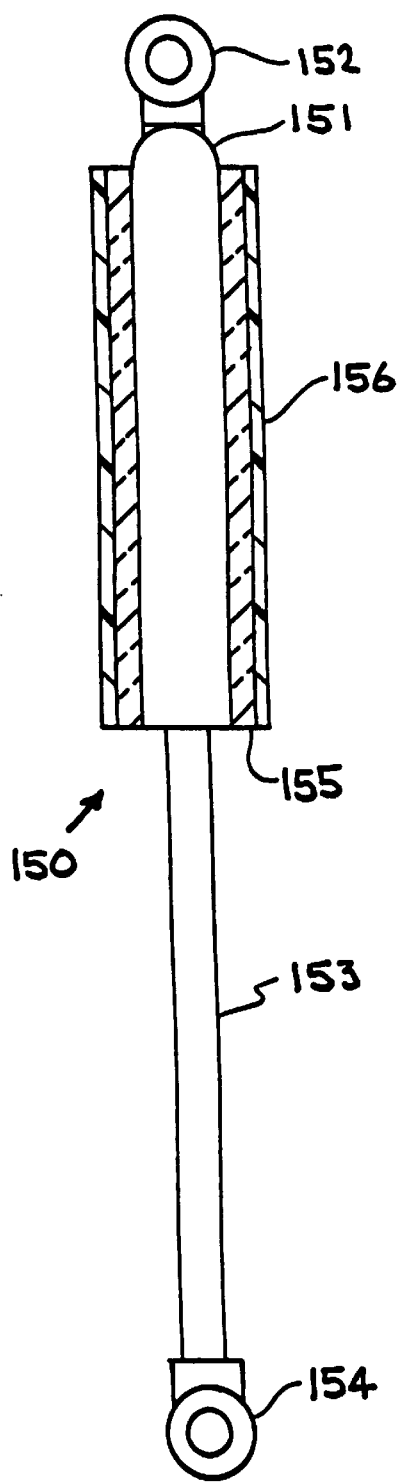
FIGS. 17 and 18 illustrate embodiments of strut assemblies for the hinged side panels of FIG. 10, with FIG. 17 having an insulated jacket or liner, while FIG. 18 includes a heater unit, thermostatically or manually controlled.

As shown in FIGS. 9 and 10, the collapsible material carrier 50 is combined with a hidden storage system mounted in the bed 42 of pickup truck 40, with the storage system being generally similar to the embodiment of FIGS. 1–4. As in FIGS. 1–4, a side panel section 75 on each side as seen in FIG. 10 is hinged to expose the interior of storage boxes 76 and 77 having openings therein and located adjacent the side panels 45 of the bed 42. The embodiment of the storage system of FIGS. 9–10 differs from that of FIGS. 1–4 in that the hinged side panel section 75 extends from the forward edge 45" of side panel 45 to adjacent tail-light assembly 46, with only a cut line 79 extending beneath the tail-light assembly 46, such as shown in FIGS. 5 and 6. Also, the storage boxes 76 and 77 extend the full length of the bed 42, but may be less length, as seen in FIG. 4. Also, the hinged side panel sections 75 of FIGS. 9–10) may be constructed as shown in FIG. 17 wherein the tail-light assembly is also hinged to open with the side panels.

If the pickup bed 42 includes a hidden storage system as shown in FIGS. 9 and 10, the horizontal members 51 of collapsible material carrier 50 will rest on top of the storage boxes 76 and 77, as shown in FIG. 8. To collapse the material carrier 50, the pins 78'are removed from vertical members 52 and 53, whereby the vertical members may be lifted upwardly to remove same from within support members 78, and the vertical members 52 and 53 are folded via members 61–62 and 63–64 against horizontal members 51, and the collapsed material carrier 50 is laid on top of storage boxes 76 and 77, as shown in FIGS. 6 and 8.

Figure 13:
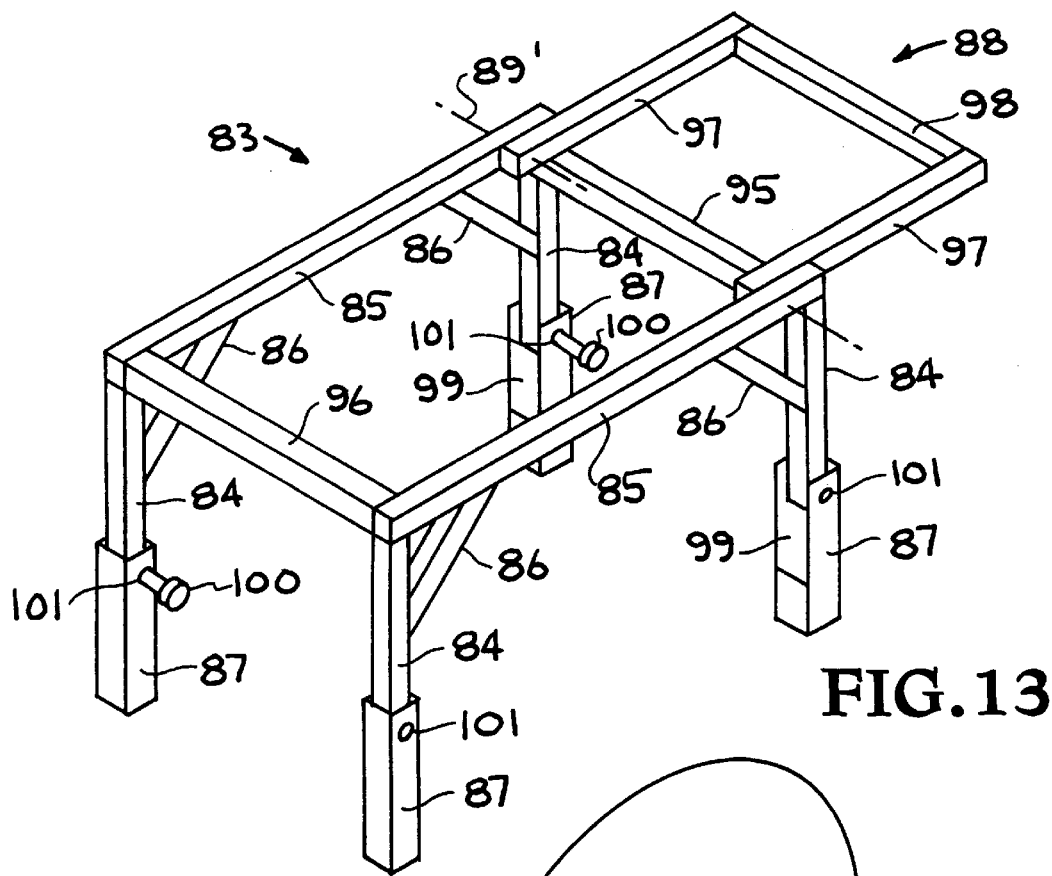
Figure 14:
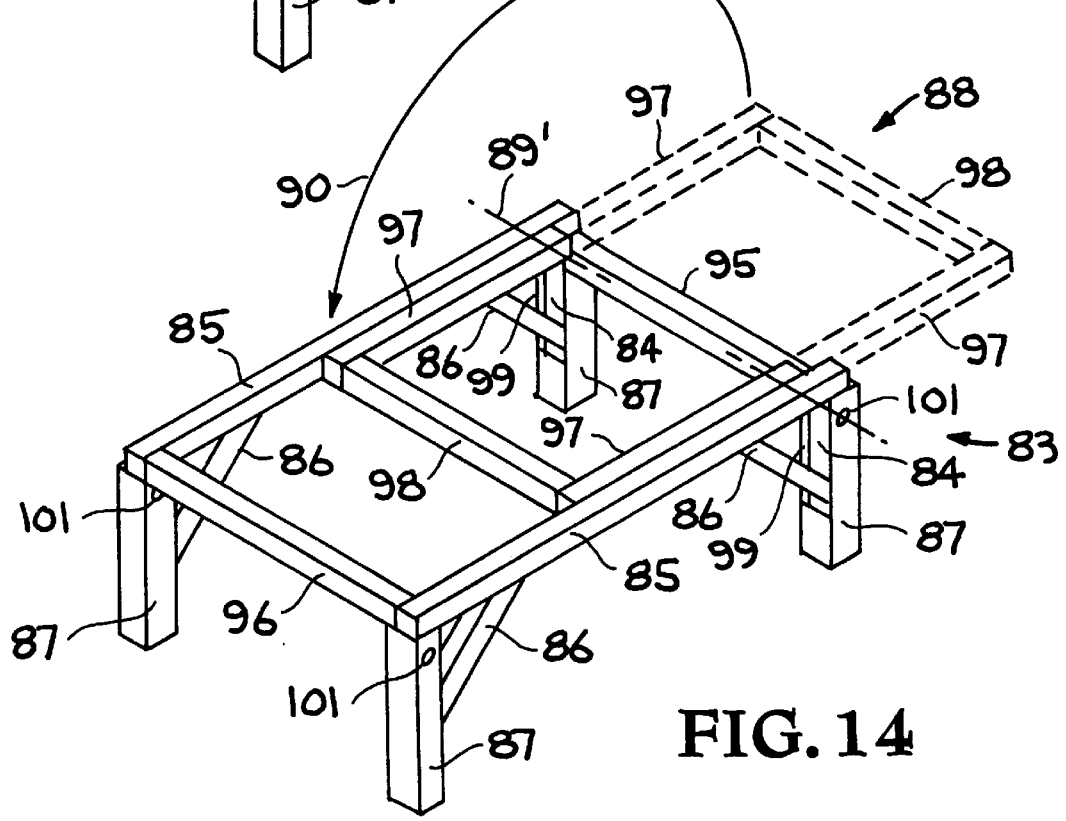

The embodiment of the vehicle mounted collapsible material carrier illustrated in FIGS. 11–14 is of a telescoping type, with FIGS. 13 and 14 showing the structural components, and wherein the support members are secured in four corners of the vehicle bed and the vertical members of the carrier are telescopically mounted in the support members. In this embodiment, the over-cab or overhang section of the material carrier is foldable rather than retractable as in the FIGS. 5–10 embodiment.

As shown in FIGS. 11 and 12, a vehicle 80 having a cab 81 and a bed 82, with side panel 82' removed in FIG. 12, and is provided with a collapsible material carrier 83 having vertical members 84 secured to opposite ends of horizontal members 85 with braces or members 86 secured to members 84 and 85, the vertical members 84 being telescopically mounted in support members 87 vertically mounted and secured in bed 82. Material carrier 83 includes an overhang or over-cab section, generally indicated at section 88, which is pivotably secured at 89 to fold between horizontal members 85 when collapsed, as shown by arrow 90. FIG. 11 illustrates the material carrier 83 in its erected or as-use position, and FIG. 12 shows the material carrier in its collapsed position within bed 82. Note that the support members 87 extend beyond the floor 91 of bed 82 into trim panel sections 92 and 93 of side panel 82' of the bed and provide sufficient length to enable the vertical members 84 to telescope thereinto. Note that in the collapsed position (FIG. 12), the material carrier 83 is located below an upper edge 94 of side panel 82' of bed 80 and thus is not visible from a side view of the bed 82.

FIGS. 13 and 14 show the components of the collapsible material carrier 83 of FIGS. 11–12 in the erected and collapsed positions. As seen in FIGS. 13 and 14, in addition to the four (4) vertical members 84, the two (2) horizontal members 85, the four (4) braces 86, the four (4) support members 87, and the foldable overhang 88, the material carrier 83 includes two cross members or stabilizers 95 and 96 positioned intermediate the front two and rear two vertical members 84, with cross member 95 secured to vertical members 84 and cross member 96 secured to horizontal members 85, as by welding, bonding, etc., depending on the composition of the members 84, 85, 95 and 96. The over hang 88 is composed of a pair of horizontal members 97 and a cross member 98 secured to members 97 as by welding, bonding, etc. The pivotal connection 89 of members 97 of overhang 88 to horizontal members 85 is along the line 89' in FIGS. 13 and 14, whereby the overhang 88 is supported by cross member 95 in its unfolded position, as shown in FIG. 13 in solid lines and by dash lines in FIG. 14, and is located as shown in solid lines in FIG. 14 in its folded position The support members 87 are each provided with cut-away sections 99 (only two shown) through which the braces 86 pass as the vertical members 84 telescope into support members 87 when material carrier 83 is collapsed, as shown in FIG. 14. In the erected position of material carrier 83, as shown in FIGS. 11 and 13, the vertical members 84 may, for example, be retained in support members 87 by removable pins 100 (two shown) which extend through openings in members 84 and 87 as indicated at 101.

Figure 15:
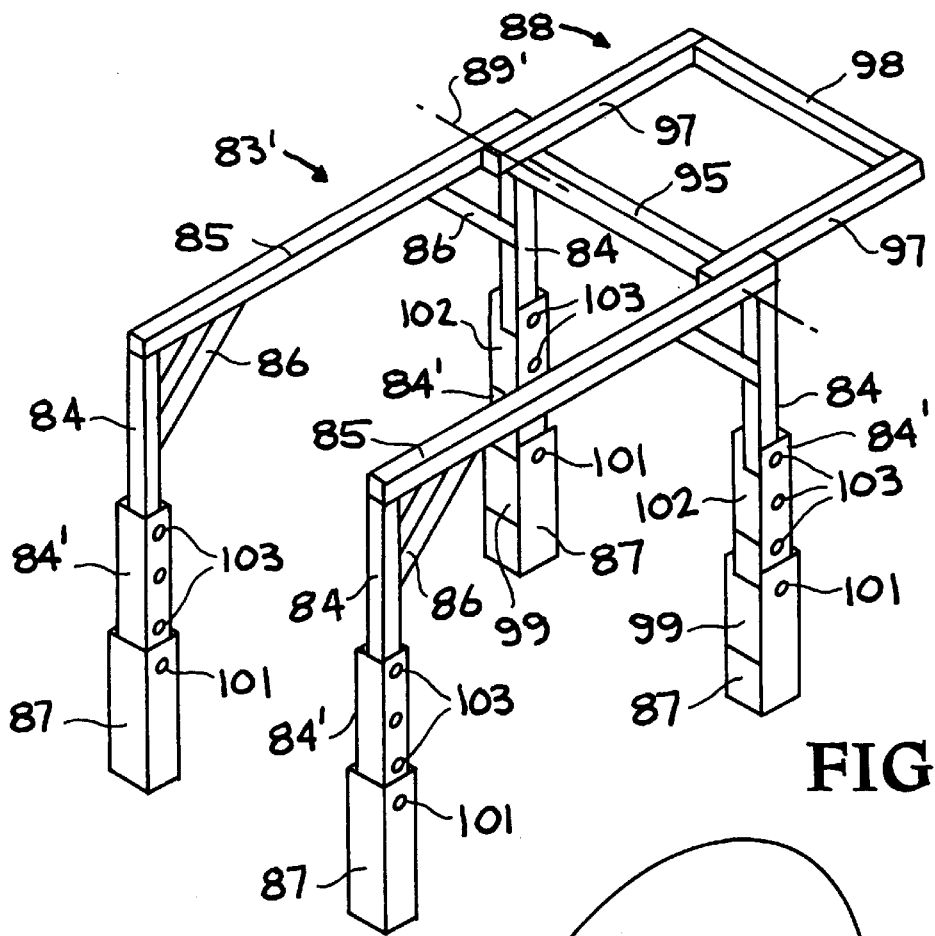
FIGS. 15 and 16 illustrate schematically another telescoping collapsible material carrier which involves two retractable vertical members.
Figure 16:
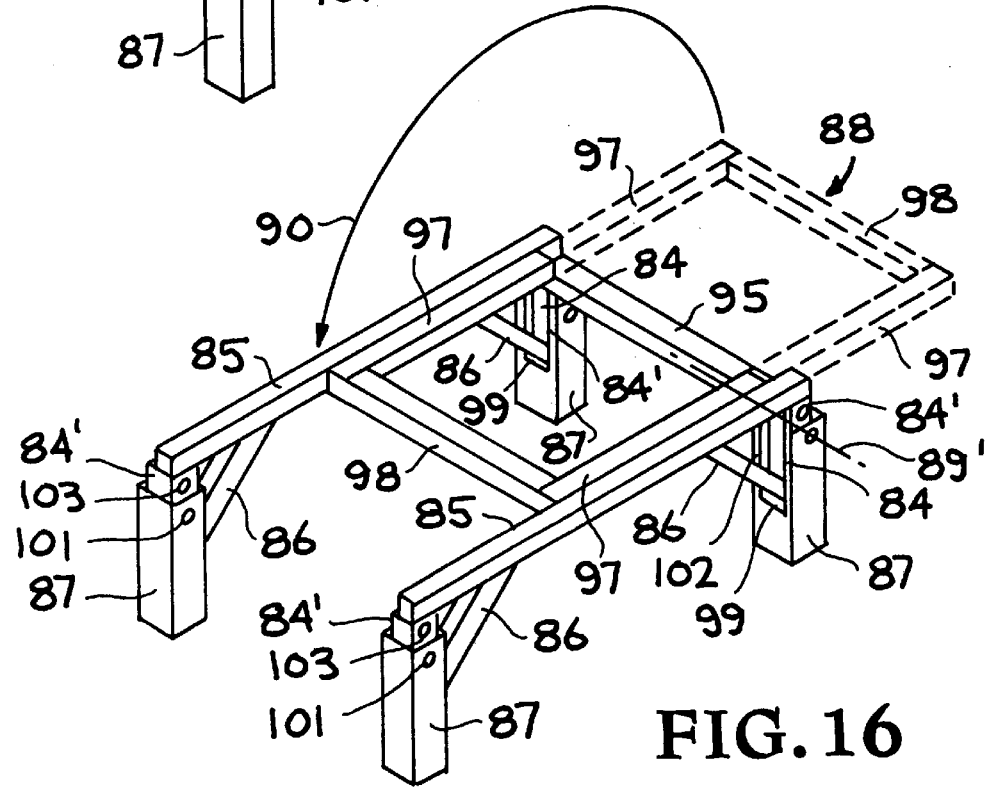

FIGS. 15 and 16 illustrate a collapsible material carrier similar in construction to FIGS. 11–14 except that the telescoping vertical members each comprise two telescoping sections which enable each of the vertical support members located in corners of the vehicle bed to have a length less than the depth of the vehicle bed. Components of FIGS. 15 and 16 which correspond to components of FIGS. 13 and 14 are given corresponding reference numerals. As seen in FIGS. 15 and 16, the four (4) vertical members 84 are telescopically mounted in four (4) vertical members 84', which are telescopically mounted in support members 87. The vertical members 84' include cut-away sections 102, similar to cut-away sections 99 of support members 87, only two shown, through which braces 86 pass as the vertical members 84' and 84 telescope into support members when material carrier 83' is collapsed, as shown in FIG. 16. While not shown, pins similar to pins 100 in FIG. 13 are removably positioned in holes 101 and holes 103 in support members 87 and vertical members 84'. As seen in FIG. 15, vertical members 84' are provided with a plurality of holes 103, three shown, by which the height of the material carrier 83' may be adjusted. If desired, height adjustment holes may be provided in vertical members 84 instead of in combination with the holes 103 in vertical members 84'.

The collapsible material carriers of FIGS. 11–14 or FIGS. 15 and 16 can be incorporated into a vehicle bed having a hidden storage system such as shown in FIGS. 5–10 wherein the collapsed material carrier rests upon the storage boxes, as described hereinafter with respect to FIGS. 26 and 28. The construction of the storage boxes on each side of the bed will need to be modified to accommodate the vertical support members located in the corners of the bed and to accommodate the braces or members interconnecting the vertical and horizontal members of the material carrier. However, for such application, the braces or members of the material carrier may preferably be omitted, and the vertical/horizontal member interconnects reinforced as by connector plates attached to the adjoining ends of the vertical and horizontal members.

While various members of the collapsible material carrier have been illustrated as being of a substantially square configuration, they may be rectangular, cylindrical, or triangular, for example. The various components of the material carrier may be constructed of any suitable material, such as metal, plastic, composition, etc., having sufficient strength to carry a load of material thereon and withstand the pressures imposed thereon by movement of the vehicle over rough terrain.

Figure 18:
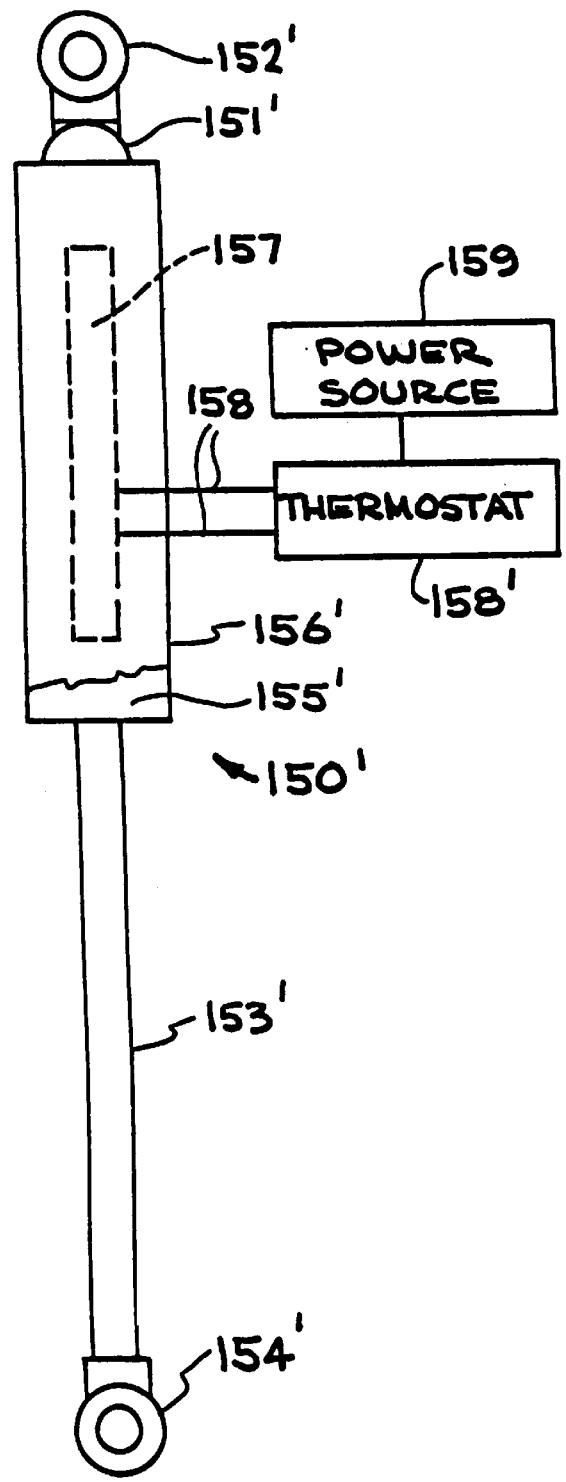

As pointed out above, upwardly opening side panels are provided with means for retaining same in open position, such as by conventional strut assemblies, widely used in the automotive field for retaining open rear windows or doors. However, spring-loaded hinges are also commercially available which are constructed to retain a door or window open, and thus could be utilized in the hinged side panels. The use of strut assemblies is generally preferred, but struts have disadvantages when operating in extreme temperature conditions, either hot or cold. This problem is resolved by the strut assemblies illustrated in FIGS. 17 and 18, wherein insulation and/or heating therefor is provided. FIG. 17 illustrates a conventional strut assembly with insulation about the body member, while FIG. 18 additionally illustrates an electrical heating strip for a conventional strut. However, the heating strip of FIG. 18 can be incorporated into the insulated strut assembly of FIG. 17. As shown in FIGS. 17 and 18, the strut indicated at 150 and 150' comprises a body member 151 and 151' having a connector member 152 and 152' at one end, and a plunger member or rod 153 and 153' having a connector member 154 and 154' reciprocally mounted in body member 151 and 151', and which is sealed in member 151 and 151' as known in the art. The body member 151-151'/rod 153-153' may be provided with a conventional fluid or air arrangement which allows the rod 153 or 153' to be moved in or retained in the body member 151 or 151'. In FIG. 17, the body member 151 is provided with a layer 155 of insulation material and a protective layer, jacket, liner or sleeve 156 about the insulation layer. However, depending on the composition of the insulation layer 155, the protective sleeve or layer 156 may not be needed. In FIG. 18, which is constructed as in FIG. 17, the body member 151' is additionally provided with one or more electrical heating strips 157 (only one shown), which would be electrically connected via electrical leads 158 via a thermostat 158', or via a manual timed switch, to the power supply 159 of the vehicle on which the strut is utilized. The electrical heating strip(s) 157 is positioned between the body member 151' and the insulation layer 155', whereby a heated/insulated strut is provided to withstand either extremely high or extremely low temperatures. However, the body member 151' may be provided with one or more heating strips, if desired. While not shown, a boot or protective member may be positioned around rod 153 or 153' in either of the embodiments of FIGS. 17 and 18 to prevent contamination.

Figure 19:
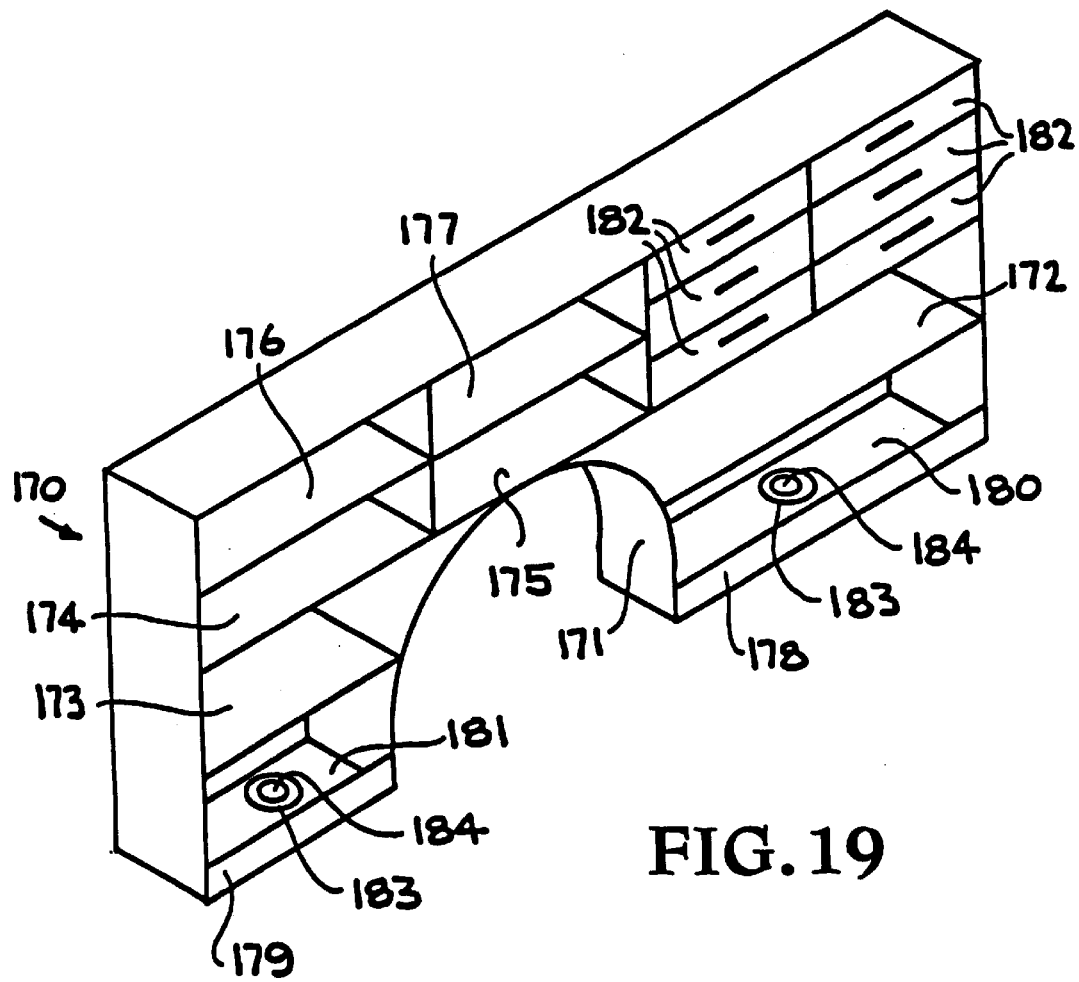
FIG. 19 schematically illustrates a shelving/storage arrangement for the storage box of the FIGS. 1–4 storage bed, and incorporating a pair of drain/air relief valves.

FIG. 19 schematically illustrates a shelf/storage compartment arrangement for tools, parts, etc. The shelves and storage compartments may be mounted so as to be movable (slideable) or adjustable. As shown in FIG. 19, a storage box such as illustrated at 22–23 or 76–77 in FIG. 2 or FIG. 9, and here generally indicated at 170, and which includes a wheel well section 171, is provided with different size and/or length shelves 172, 173, 174, 175, 176 and 177. Also, the storage box 170 is provided with upwardly extending lips or members 178 and 179 which form open boxes or compartments 180 and 181. However, the storage box 170 may be constructed to provide a flat surface at the bottom by elimination of the upwardly extending members 178 and 179, a shown in FIG. 3. The storage box 170 of FIG. 19 additionally includes six compartments or drawers, indicated at 182, for small parts, etc. Each of the compartments 180 and 181 is provided with an opening 183 containing a drain/air relief valve assembly 184.

Figure 20:
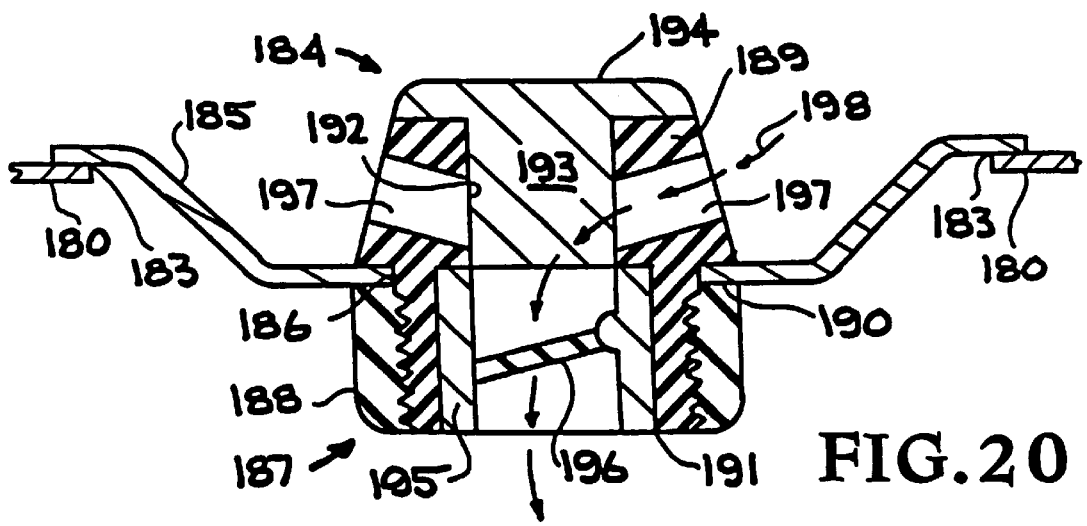
FIG. 20 is a cross-sectional view of an embodiment of a drain/air relief valve off FIG. 19.

FIG. 20 illustrates an embodiment of a drain/air relief valve assembly indicated generally at 184 in FIG. 19 which is mounted in an opening 183 in compartments 180 and 181 of storage box 170. The valve assembly 184 is mounted in opening 183 of compartment 180, for example, by a tub or member 185 having an opening 186 and is secured in opening 183 at the outer periphery thereof, and may be constructed of rubber, metal, a composite or plastic, or a combination of rubber and composite, for example. Valve assembly 184 includes a housing 187 or body members 188 and 189 secured together as by a threaded connection, not shown, with lower body member 188 having a groove 190 therein into which tub 185 extends, whereby the housing 187 is retained in opening 186 of tub 185. The housing 187 may be constructed of EPDM compound or rubber, for example. Body members 188 and 189 are provided with aligned openings 191 and 192, with a plug or member 193 having a pull grip 194 extending into opening 192. Opening 191 in lower body member 188 is provided a valve 195 having a flexible member 196 while upper body member 189 is provided with a plurality of radially extending openings 197. Flexible member 196 may be constructed of rubber, for example. Upon raising the plug 193 via the pull grip 194, water and/or air within compartment 180 of storage box 170 flows through radial openings 197 and moves downwardly (opens) flexible member 196 of valve 195, as illustrated by flow arrows 198. With the plug 193 in place, as shown in FIG. 20, air or moisture will not pass upwardly due to seating of flexible member 196 of valve 195.

Figure 21:
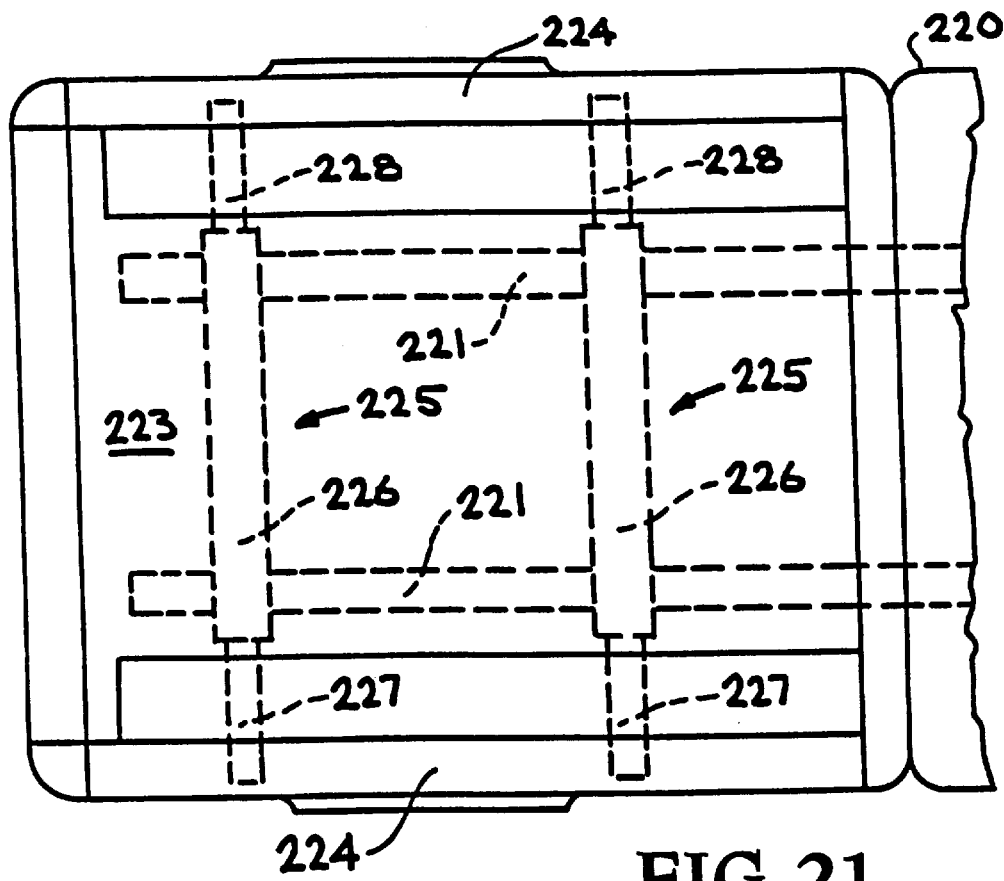
FIGS. 21 and 22 illustrate an embodiment of a collapsible support system for providing support for a vehicle, shown in exploded view in FIG. 22, and providing protection for the fuel tank typically located under the bed.
Figure 22:
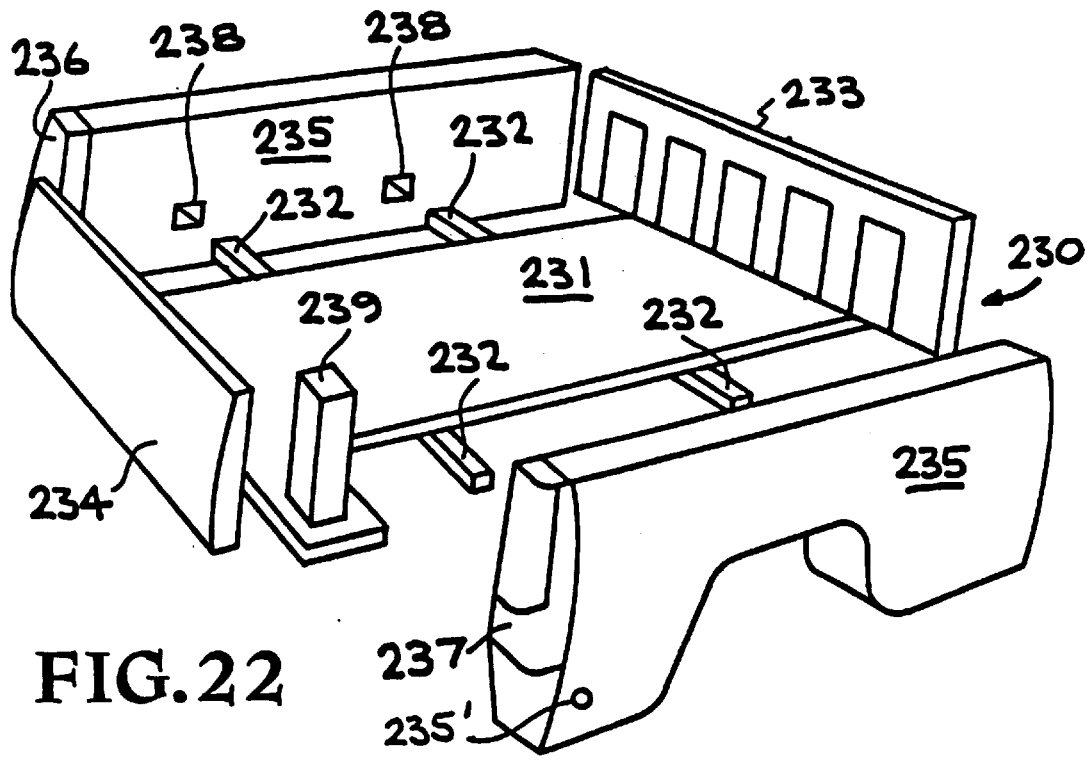

The vehicle bed, as illustrated in FIGS. 1–4 and 5–10, for example, may be provided with support/safety mechanisms, as illustrated in FIGS. 21 and 22, which comprise a pair of collapsible beams. Upon impact from a side of the storage system, the beams collapse rather than bending, thereby preventing rupture or puncture of a fuel tank, typically located beneath the bed of a pickup truck.

As seen in FIGS. 21 and 22, a vehicle 220, such as a pickup truck, having frame members 221 and wheels mounted on an axle, not shown, is provided with a bed 223 having side panel/fenders 224. A pair of collapsible support beams 225 are mounted across the frame members 221 and extend outwardly so as to terminate inside the side panel/fenders 224. As seen in FIG. 21, each of the collapsible support beams 225 is composed of a central section 226 and end sections 227 and 228 that are constructed to extend into central section 226. Beams 225 may be square, rectangular, circular, etc. in configuration. The length of the central section 226 and the length of end sections 227 and 228 is determined by the width of the bed 223. The end sections 227 and 228 may be spot welded, for example, at a desired point to central section 226, and upon impact the spot weld is broken and the impacted end section collapses into the central section 226, which prevents the bed 223 from bending downward toward the fuel tank located beneath the bed.

FIG. 22 illustrates a modular assembly approach for the bed of FIG. 21 utilizing the collapsible support members or beams. As shown schematically in FIG. 22, the bed generally indicated at 230 is basically composed of five modules or assemblies comprising a floor assembly 231 to which collapsible support beams 232 are mounted or connected, a bulkhead assembly 233, a tailgate assembly 234, and a pair of side panel assemblies 235 having connected thereto tail-light assemblies 236 and 237, respectively. Side panel assemblies 235 are provided with openings 238 into which collapsible support beams 232 extend. Floor assembly 231 includes a pair of support posts 239, only one shown, to which the rear of side panel assemblies 235 are secured. The side panel assemblies 235 may be constructed as illustrated in FIGS. 1–4, 5–10 or 23, for example, or constructed to include a plurality of hinged side panel sections which may open upward, downward, or sideways. If desired, an optional key entry or slot 235 may be incorporated into side panel assemblies 235 to release the side panel.

FIG. 23 illustrates a side view of a hidden storage system mounted in one or both side panels of a vehicle, such as a pickup bed illustrated in FIGS. 1–4 and 5–10. If the storage system is mounted in the side panel of a pickup, for example, the pickup bed may be constructed as a modular assembly, such as illustrated in FIG. 22, with or without the collapsible support members of FIGS. 21 and 22. The side panel of FIG. 23, indicated generally at 290, includes a wheel well 291 and a tail-light assembly 292 which is secured to a hinged side panel section 293. The hinged side panel section 293 includes a cut away section 294 that corresponds to and cooperates with the wheel well 291. The side panel 290 includes a storage box 295 which extends over and fore and aft of wheel well 291, and with the fore and aft sections of unhinged sections 296 and 297 defining bins 298 and 299 having hinged lids 300 and 301. The remainder of the storage box provides a space above the bins 298 and 299 and above the wheel well 291 in which shelves or compartments may be installed, such as illustrated in FIG. 19. As shown in FIG. 23, a sliding shelf 302 is mounted above the wheel well 291, and which may serve as a work top, and a shelf 303 extends along the length of the storage box 295, and which may be of an adjustable type. The hinged side panel section 293 is retained open by spring-loaded type hinge assemblies indicated at 304 and 305, but strut assemblies such as illustrated in FIGS. 17 and 18 may be utilized with one or more horizontally extending hinges along an upper edge of the side panel section 293. While not shown, each of the bins 298 and 299 may be provided with a drain/air relief valve assembly, as illustrated in FIGS. 19 and 20. Also, a seal assembly, not shown, would be located adjacent the periphery of the hinged side panel section 293 when closed, and may be of a heated type, such as described and claimed in copending U.S. application Ser. No. 09/082,436 filed May 20, 1998 entitled "Vehicle Compartment Seals". If desired, an optional key entry indicated at 306 may be installed to release side panel section 293. As shown, the hinged side panel section 293 extends from the forward lip or end of the side panel 290 to the rear end of the bed and includes the tail-light section 292, which is electrically connected by an electrical harness, not shown, which allows the tail-light section 292 to be raised with the side panel 290.

FIGS. 24 and 25 illustrate an embodiment of a pickup truck bed having side opening doors which allow access to the bed through the side panels, and may be covered by a tonneau cover or a camper unit, and includes structural yokes to strengthen the side panels. The side opening doors, which constitute sections of the side panel of the bed, are hinged vertically to enable them to open sideways when, for example, a camper unit extends outwardly from the top of the bed. However, the side doors may be hinged horizontally, if desired, and if hinged along a lower edge may open downwardly to form a table or work bench. If the side doors were hinged to open upwardly or downwardly, then a strut assembly or a foldable mechanism, such as used on a pickup bed tailgate, would be attached to the doors to maintain the doors in open position.

The pickup bed of FIG. 24, generally indicated at 330, includes a floor, not shown, a front section or bulkhead 331, a tailgate 332, and a pair of side panels 333 and 334 having wheel wells 335, only one shown. The bed 330 may be provided with collapsible support beams under the floor, and may be constructed in modular form as shown in FIGS. 21 and 22.

To provide structural support, the bed 330 includes a pair of yokes or U-shaped members, generally indicated at 336, see FIG. 25, located fore and aft of the wheel wells 335. The structural yokes 336 may be similar to the structural posts utilized at the front and rear corners of the bed to stop spread of the bed, such as shown in FIG. 22. The side panels 333 and 334 each include a pair of hinged sections defining side opening doors 337 and 338 located fore and aft of wheel wells 335. In this embodiment, the doors 337 and 338 are hinged vertically so as to open in a direction indicated by arrows 337' and 338'. As in the embodiments of FIGS. 1–4 and 22, for example, the doors 337 and 338, when closed, provide a continuous contour of the design of the side panels 333 and 334, with the exception of the cut-lines defining the edges of the doors, and are preferably provided with hidden lock/latch mechanisms, as in FIGS. 1–4, whereby the doors do not detract from the appearance of the side panels. In some beds, only a single structural yoke 336 may be utilized. Also, by use of the structural yokes 336, the top rail of one or both of the side panels 333 and 334 may be cut as indicated by dotted lines 333' on side panel 333 only, whereby the top rail section can be hinged open with the doors 337 and 338.

As seen in FIG. 25, the structural yokes 336 include a horizontal section 339 and vertical sections 339', with the horizontal section 339 extending under the floor of bed 330 and vertical sections being located within conventional inner and outer panels of the side panels 333 and 334.

In FIG. 24, the side panels 333 and 334 may be of the conventional side panel construction having inner and outer panel sections, whereby the doors 337 and 338 include the inner and outer panel sections, or the inner panel section of each of the doors 337 and 338 can be removed and the outer panel section reinforced, if needed. The hinged doors 337 and 338 enable access to the interior of the bed without removing the tonneau cover or camper if installed in the bed.

If desired, the embodiment of the vehicle bed of FIG. 24 can incorporate a hidden storage system by providing a storage box with an opening therein adjacent the doors 337 and 338. Also, if desired, the side panels 333 and 334 may include a hinged or sliding section above the wheel wells 335, which can also open into a storage box located above the wheel well section of the floor of the bed 330.

Figure 26:
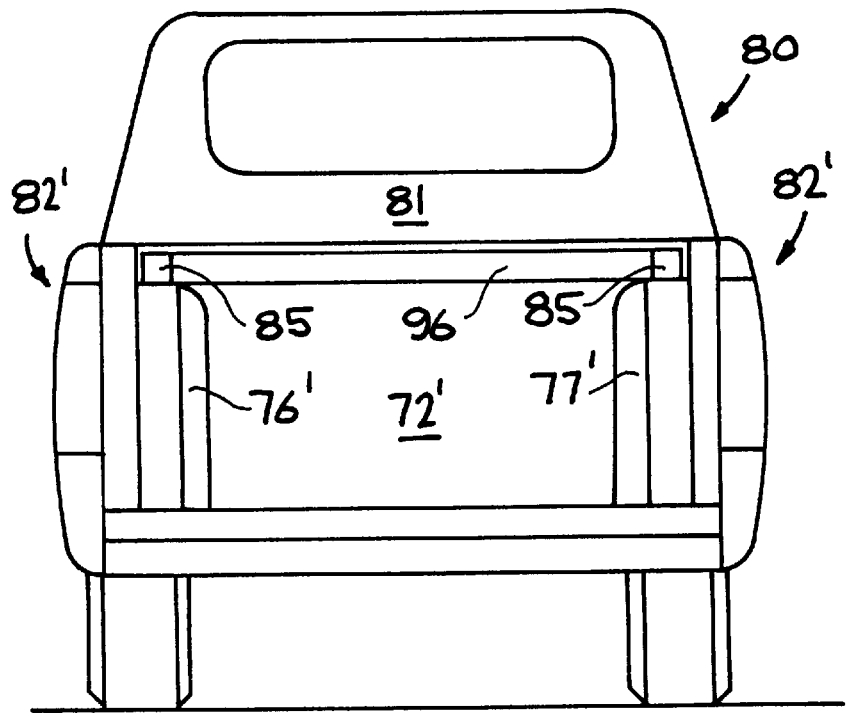
FIG. 26 is a rear or end view similar to FIG. 8, but with the material carrier of FIGS. 11–14 collapsed into the bed.
Figure 27:
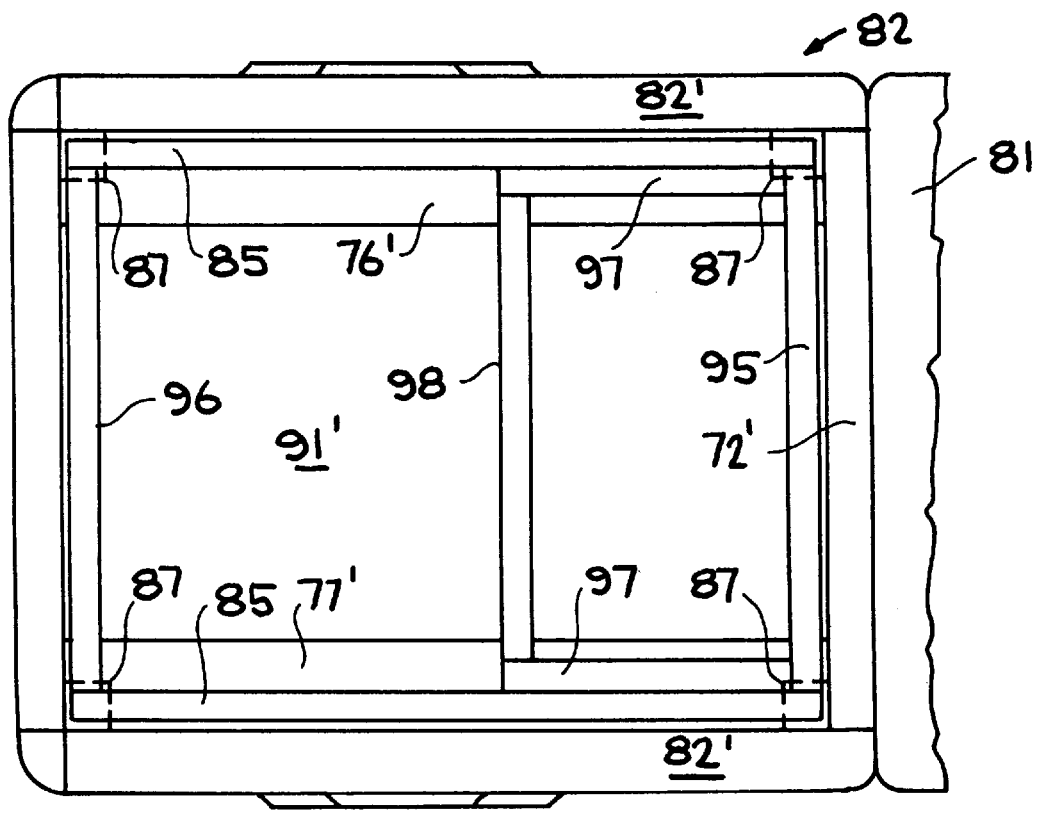
FIG. 27 is a top view of the pickup of FIG. 26 with the material carrier in collapsed position.

FIGS. 26 and 27 are generally similar to FIGS. 8 and 9, and illustrate the collapsible material carrier of FIGS. 11–14 collapsed into a hidden storage system. FIG. 28 combines the collapsible support mechanism, similar to FIGS. 21 and 22, in combination with corner support members for the telescoping members of the material carrier, such as shown in FIGS. 13–16 and the hidden storage system of FIGS. 1–4, for example.

FIGS. 26 and 27 illustrate a pickup similar to FIGS. 8 and 9, generally indicated at 80, having a cab 81 and a bed 82 having hidden storage side panels 82' and a bulkhead 72', and in which are secured storage boxes 76' and 77', as described above with respect to FIGS. 8 and 9. When the collapsible material carrier is collapsed, as illustrated in FIGS. 13–14, for example, it sits on the storage boxes 76' and 77' and below the top of the hidden storage side panels 82'. As shown, members 85, 95, 96, 97 and 98 of the collapsed material carrier 83 and folded overhang 88 are located within the bed such that same are not visible from a side view. While not shown in FIG. 2 due to duplication of the drawings, the pickup bed is provided with collapsible support members, as shown at 325 in FIG. 28.

Figure 28:
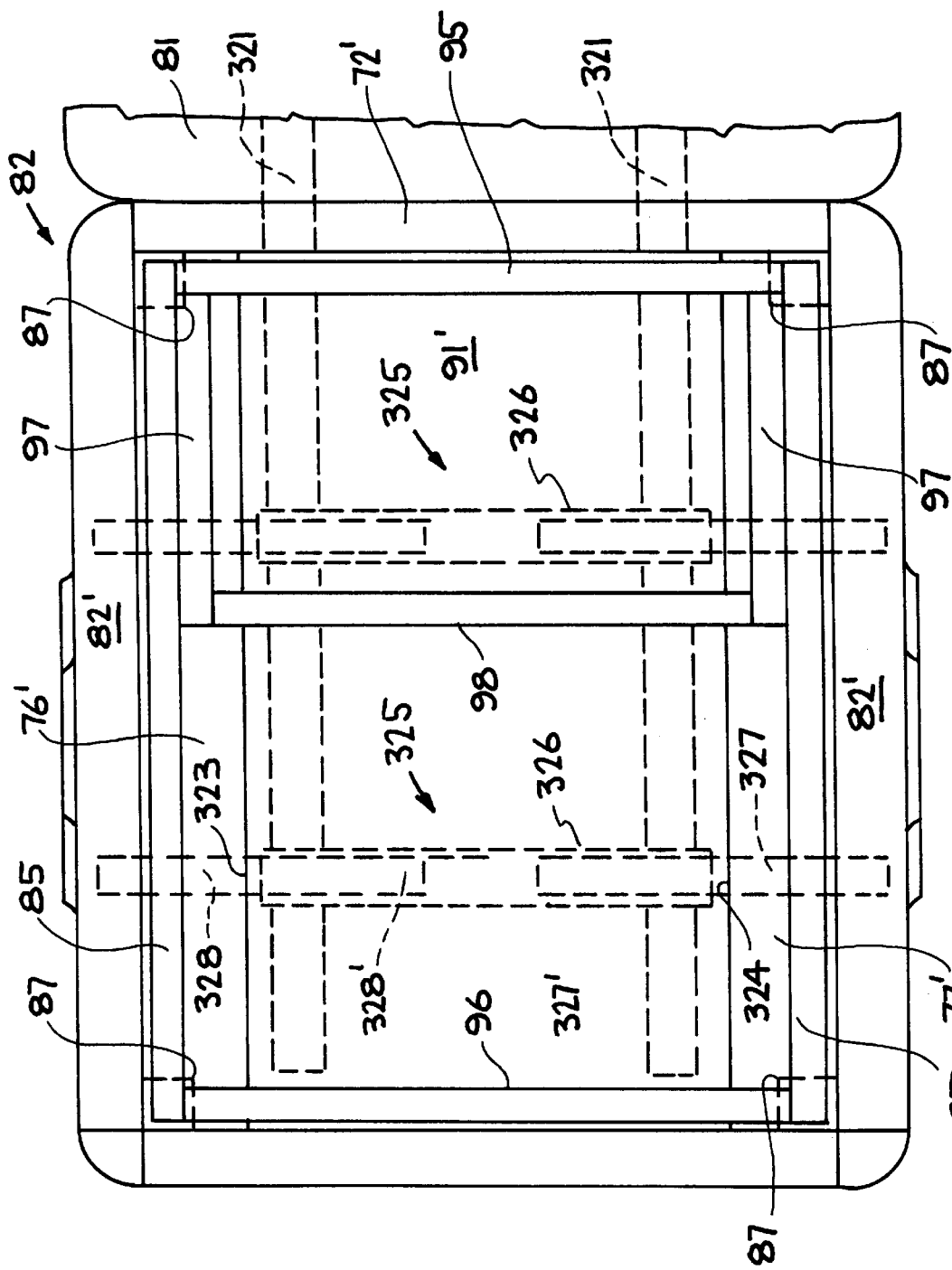
FIG. 28 is a view similar to FIG. 27 showing a support/safety mechanism for the bed.

FIG. 28 illustrates an embodiment of a support/safety mechanism in combination with the collapsible material carrier and the hidden storage system of FIGS. 26 and 27, the support/safety mechanism comprising a pair of collapsible support beams located above a frame of the pickup and below the floor of the bed, and such was described in greater detail relative to FIGS. 21 and 22. As shown in FIG. 28, the vehicle having frame members 321 under a floor 91' of bed 82 includes a pair of collapsible beams generally indicated at 325 located under bed 82 and transverse to frame members 321. Collapsible beams 325 include a center section 326 and end sections 327 and 328 which have inner ends 327' and 328' which extend into center sections 326 and may be secured in center sections 326 such as by spot welding. The end sections 327 and 328 extend into openings 323 and 324 in storage boxes 76' and 77'. Upon side impact, the beam end sections 327 or 328 collapse into center sections 326, whereby the bed 82 is forced upwardly preventing rupture of the fuel tank located beneath the bed.

It has thus been shown that the present invention provides a collapsible material carrier which can be used with or without a hidden storage arrangement that can be initially built into a pickup truck bed, or a conventional bed can be converted to include the storage arrangement without altering the external appearance of the bed and without a significant reduction in the carrying capacity of the bed. The collapsible material carrier collapses into the vehicle bed so as not to be visible from a side view of the bed. Thus a pickup truck, for example, now is provided with a trunk. The collapsible material carrier collapses onto the storage boxes of the storage system. While the invention has been described with respect to fleetside and stepside pickup beds, it can be readily incorporated into other types of pickup beds, trailers or full-sized truck beds, such as the dual wheel truck, having side panels without detracting from the appearance of the side panels, except for any vertical or horizontal cuts therein. Also, the hinged fender/side panel can be hinged along the entire length by a single hinge or a plurality of hinges whereby the entire side panel, including the tail-light section, can be opened and closed to eliminate any vertical cut lines.

While a specific embodiment of the collapsible material carrier and embodiments of the storage system have been described and illustrated, such are not intended to limit the invention to these embodiments. For certain applications, only one storage box may be desired. Beds for pickups, trailers, and trucks are designed with differently constructed side panels or fender/side panels and frame/undercarriage arrangements. For example, the bed 12 of FIG. 1 may extend downward to include the outer trim panels 13 on the undercarriage, as shown, and thus the side panels 15 would include the extended area, or cuts, such as indicated at 35 and 36 in FIG. 1, can be made along a desired lower portion of the side panels to eliminate the need for raising the entire side panel when the extended area is part thereof.

Various side panel sections and associated storage box sections have been illustrated and/or described, as well as various shelving/compartment arrangements. It is understood that each storage system can be fabricated to include specific side panel opening arrangements (up or down or sideways), as well as the entire or only sections of the side panel(s) being hinged, depending on the user's need. The shelving/compartment arrangements can be made in accordance with a user's needs. The primary feature of the hidden storage bed is the fact that there is substantially no alteration of the external appearance of the side panels, the only alteration being lines formed by the cuts to provide the desired hinged panel or hinged panel sections.

While not shown, the hinged panel sections may be coated on the inner surfaces thereof with insulating and/or sound absorbing materials conventionally used in the automotive field. If desired, the interior of the storage boxes may be coated with similar materials. While not shown, the edges of the side panels adjacent the hinged panel sections may be provided with seals, similar to the seals utilized for automotive trunks, to prevent moisture or dust from entering the storage boxes when the hinged panel sections are closed. Since the lock and/or latch mechanism for the hinged side panel sections are not visible from an external view of the vehicle, they constitute a hidden latch mechanism. However, if desired, the lock, such as a key actuated mechanism, may be installed in a side panel section and thus would not be hidden from view. Also, it is within the scope of this invention to provide a prefabricated bed which includes the storage system and/or the collapsible material carrier, and which can be mounted on cab chassis vehicles which are manufactured and sold without beds. Also, the storage system and/or collapsible material carrier can be installed on or built into a bed with wide (expanded) side panels and/or fenders, such as utilized on dual rear wheel pickups and trucks, whereby the storage area would be substantially expanded. Also, by use of the support yokes, the top rail of the side panel may be cut so as to be hinged with the side panel sections, such as shown by dotted lines in FIG. 24.

Modifications and changes may become apparent to those skilled in the art, and it is intended that the invention be limited only by the scope of the appended claims.

What is claimed is:

1. In a vehicle bed having a material carrier mounted thereto, the improvement comprising:

said material carrier being collapsible into said bed, said vehicle bed additionally including side panels, a hidden storage system located adjacent at least one of said side panels, said at least one of aid side panels having a least one section thereof hinged to provide access to said hidden storage system, said hidden storage system including a box having an opening therein and located adjacent at least said hinged side panel section, wherein said collapsible material carrier rests on said box when collapsed, and a lock/latch mechanism for said hinged section.

2. The vehicle bed of claim 1, wherein said collapsible material carrier includes a main section and an overhang section, said main section including support means located in said vehicle bed, said overhang section being at least partially retractable into or foldable onto said main section, said main section additionally including a pair of horizontal members and two pairs of vertical members, each of said horizontal members being connected to one member of each of said two pairs of vertical members, and a pair of foldable members, each foldable member being pivotably connected to one of said horizontal members and a vertical member connected to said one of said horizontal members.

3. The vehicle bed of claim 2, additionally including at least a pair of cross members, each cross member being connected to extend between a pair of vertical members.

4. The vehicle bed of claim 3, wherein said overhang section includes a pair of horizontal members operatively connected to said pair of horizontal members of said main section, and a cross member connected to each of said pair of horizontal members of said overhang section.

5. The vehicle bed of claim 4, wherein said over hang section is operatively connected to said pair of horizontal members by an arrangement selected from the group consisting of a slideable mount and a foldable mount.

6. The vehicle bed of claim 2, additionally including vertical support members which are hollow and secured to said vehicle bed for retaining each of said two pairs of vertical members.

7. The vehicle bed of claim 6, wherein said hollow vertical support members have a length selected from the group consisting of greater than a depth of said bed and less than a depth of said bed.

8. The vehicle bed of claim 1, wherein said box has a height less than said side panels of said vehicle bed, and wherein said collapsible material carrier when collapsed position is not visible from a side view of said bed.

9. The vehicle bed of claim 1, additionally including at least one strut assembly for said at least one hinged side panel section.

10. The vehicle bed of claim 1, additionally including at least one drain/air relief valve assembly in a bottom section of said box.

11. The vehicle bed of claim 1, additionally including means located in said box selected from the group consisting of shelves, adjustable shelves, slideable selves, bins and compartments.

12. The vehicle bed of claim 1, additionally including at least one storage bin located fore or aft of a wheel well of said bed.

13. The vehicle bed of claim 1, additionally including a pair of storage bins located fore and aft of a wheel well of said bed.

14. The vehicle bed of claim 1, additionally include a collapsible support structure located beneath a floor of said bed.

15. The vehicle bed of claim 1, wherein said at least one side panel includes an additional hinged section, and the other of said side panels includes a pair of hinged sections.

16. The vehicle bed of claim 1, wherein said at least one hinged section is vertically hinged to enable sideways opening.

17. The vehicle bed of claim 1, wherein said collapsible material carrier includes a main section and an overhang section, said main section including support means located in said vehicle bed, said overhang section being at least partially retractable into or foldable onto said main section, said main section additionally including a pair of horizontal members and two pairs of vertical members, each of said horizontal members being connected to one member of each of said two pairs of vertical members, and wherein said two pairs of vertical members are each telescopically mounted in said hollow vertical support members.

18. The vehicle bed of claim 17, wherein said hollow vertical support members are located adjacent each corner said vehicle bed, and wherein said two pairs of vertical members of said main section of said material carrier are telescopically mounted in said hollow vertical support members.

19. The vehicle bed of claim 18, wherein said two pairs of vertical members of said main section of said material carrier each include a pair of members telescopically interconnected.

20. The vehicle bed of claim 1, wherein said box and said at least one of said side panels comprise a single modular assembly, wherein said section of said at least one of said side panels is hinged horizontally to said single assembly, and wherein said single assembly includes at least one bin, whereby outward movement of said section of said at least one of said side panels provides access to an interior of said box and access to said at least one bin.

* * * * *